(12) United States Patent
Kodama

(10) Patent No.: US 6,188,463 B1
(45) Date of Patent: Feb. 13, 2001

(54) SCANNER SYSTEM

(75) Inventor: Shinichi Kodama, Hino (JP)

(73) Assignee: Olypus Optical Co., Ltd., Tokyo (JP)

( * ) Notice: Under 35 U.S.C. 154(b), the term of this patent shall be extended for 0 days.

(21) Appl. No.: 08/999,494

(22) Filed: Dec. 29, 1997

Related U.S. Application Data

(63) Continuation of application No. 08/121,148, filed on Sep. 13, 1993, now abandoned.

(30) Foreign Application Priority Data

Sep. 14, 1992 (JP) .................................................. 4-245255

(51) Int. Cl.⁷ ............................. G03B 27/52; H04N 1/036
(52) U.S. Cl. .............................. 355/40; 355/41; 358/487; 396/311; 396/319; 348/96
(58) Field of Search ..................................... 358/401, 474, 358/475, 486, 487, 506; 355/40, 41; 396/311, 319; 348/96

(56) References Cited

U.S. PATENT DOCUMENTS

| | | | |
|---|---|---|---|
| 4,004,079 | * | 1/1977 | Boston .................................. 358/302 |
| 4,423,439 | * | 12/1983 | Watanabe ............................. 358/451 |
| 4,482,924 | * | 11/1984 | Brownstein .......................... 358/302 |
| 4,862,284 | * | 8/1989 | Murata ................................. 358/474 |
| 4,929,971 | * | 5/1990 | Imura ..................................... 355/40 |
| 4,965,626 | * | 10/1990 | Robinson et al. ..................... 355/40 |
| 4,974,096 | * | 11/1990 | Wash ..................................... 355/40 |
| 4,987,439 | * | 1/1991 | Cloutier ................................ 355/40 |
| 5,023,711 | * | 6/1991 | Erhard .................................. 358/506 |
| 5,027,140 | * | 6/1991 | Cloutier ................................ 396/311 |
| 5,083,214 | * | 1/1992 | Knowles ............................... 358/403 |
| 5,210,600 | * | 5/1993 | Hirata ................................... 358/474 |
| 5,278,609 | * | 1/1994 | Sakaida ................................... 355/40 |
| 5,420,700 | * | 5/1995 | Maeda et al. ........................ 358/487 |
| 5,467,198 | * | 11/1995 | Aosaki et al. ....................... 358/474 |

FOREIGN PATENT DOCUMENTS

| | | | |
|---|---|---|---|
| 7631 | * | 2/1981 | (JP) . |
| 62-3559 | * | 1/1987 | (JP) . |
| 62-206963 | * | 9/1987 | (JP) . |
| 36768 | * | 9/1988 | (JP) . |
| 2-201170 | * | 1/1990 | (JP) . |
| 2-100459 | * | 4/1990 | (JP) . |
| 4-335760 | * | 11/1992 | (JP) . |

\* cited by examiner

Primary Examiner—Alan A. Mathews
(74) Attorney, Agent, or Firm—Volpe and Koenig, P.C.

(57) ABSTRACT

A system for reading an image formed on a silver-salt film, comprising: (a) a magnetic information reading unit for reading magnetic information recorded on a magnetic recording medium on the film; (b) a feeding unit for feeding the film; (c) an illuminating unit for irradiating light to the image formed on the film; (d) a filter unit arranged between the illuminating unit and the film; (e) a photoelectric conversion unit for receiving the light from the illuminating unit, which is passed through the film, to convert the image formed on the silver-salt film to an electric signal; (f) a memory unit for storing an image signal from the photoelectric conversion unit; and (g) a control unit for controlling at least one of the feeding unit, the illuminating unit and the photoelectric conversion unit, on the basis of information of the information reading unit.

59 Claims, 20 Drawing Sheets

FIG.17

| | LONGITUDE ↑ ←TRANSVERSE | | TRIMMING INFORMATION | TABLE VALUE LONGITUDE Ta | TRANSVERSE Tb |
|---|---|---|---|---|---|
| | □ | NORMAL | T=00 | x1.0 | x1.0 |
| | ▯▯▯ | HALF | T=01 | x $\frac{4}{3}$ | x1.5 |
| | ▭ | PANORAMA | T=10 | x2.0 | x2.0 |
| | ▣ | ZOOM x 2 | T=11 | x2.0 | x2.0 |

FIG.18
| | ZOOM MODE | | TABLE VALUE Za |
|---|---|---|---|
| 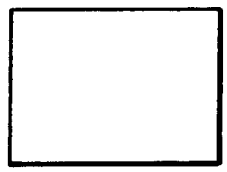 | NORMAL | Z=000 | x1 |
| 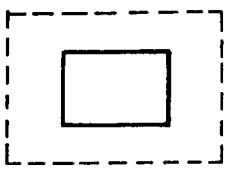 | x$\frac{1}{2}$ | Z=001 | x2 |
| 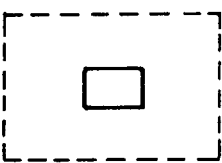 | x$\frac{1}{4}$ | Z=010 | x4 |
| 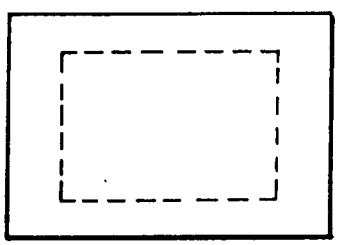 | x$\frac{3}{2}$ | Z=110 | x$\frac{2}{3}$ |
| 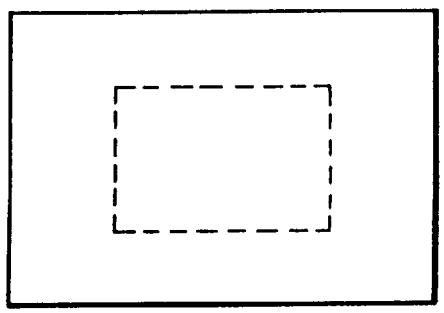 | x2 | Z=111 | x$\frac{1}{2}$ |

SCANNER SYSTEM

This is a continuation of application Ser. No. 08/121,148, filed Sep. 13, 1993, now abandoned.

BACKGROUND OF THE INVENTION

1. Field of the Invention

The present invention relates to scanner systems and, more particularly, to a scanner system which converts image information of a film to electronic image information.

2. Related Art And Prior Art Statement

Conventionally, in Japanese Patent Publication No. SHO 56-7631 and Japanese Utility Model Publication No. SHO 63-36768, technical means is disclosed which reads a film by a one-dimensional sensor to convert the film to a video signal. Further, in recent years, proposed have been a film-image fetching apparatus such as a FOTOVIX (trade name: manufactured by Kabushiki Kaisha Tamuron) or the like, and a system for fetching image information of the film by an image pickup element such as a two-dimensional CCD or the like due to a macro mode or the like such as still video or the like.

Moreover, in Japanese Patent Laid-Open No. HEI 2-20170, technical means is disclosed which pre-scans a reading image to set a reading condition.

Meanwhile, U.S. Pat. No. 4,965,626 discloses a film capable of recording various information (date, correcting values, type or kind and the like) upon photographing.

Nevertheless, in the technical means due to Japanese Patent Publication No. SHO 56-7631, Japanese Utility Model Publication No. SHO 63-36768 and the like, in a case where an image of the film is electronically imaged, it is necessary to perform setting of brightness, setting of trimming, and the like by a hand or manual operation. Particularly, in a case where correction such as exposure correction or the like is performed upon film photographing, it is difficult for general users to conform to the condition. Furthermore, for the technical means which uses the above-described two-dimensional CCD, it is necessary to use a large-size two-dimensional sensor in order to improve resolution. This causes an increase in camera size and an increase in cost.

Further, in the technical means due to the above-described Japanese Patent Laid-Open No. HEI 2-20170, in a case where pre-scanning is performed to set various kinds of conditions, surplus or extra operation is required. Moreover, in a case where exposure correction is performed, or the like, advantages of the exposure correction cannot be expected.

Meanwhile, in a case where the image information of the film due to the aforesaid U.S. Pat. No. 4,965,626 is read by the scanner or the like, various information recorded as above mentioned cannot be fed-back. Thus, U.S. Pat. No. 4,965,626 has a problem that an adequate electronic image cannot be reproduced or cannot reappear.

OBJECTS AND SUMMARY OF THE INVENTION

It is a first object of the invention to provide a scanner system which automatically performs setting of a condition adequate or optimum for electronic imaging of a film, by a simple arrangement.

It is a second object of the invention to provide a scanner system which sets an image fetching condition of a scanner on the basis of information recorded onto a magnetic recording medium on a film, to obtain or produce an adequate electronic image similar to that upon film photographing, by a simple operation.

It is a third object of the invention to provide a scanner system which is capable of easily converting an image of a film to an adequate electronic image on the basis of trimming information which is recorded onto a magnetic recording medium on a film.

It is a fourth object of the invention to provide a scanner system which is capable of easily converting an image of a film to an adequate electronic image, on the basis of luminance information or intensity information which is recorded on a magnetic recording medium on the film.

It is a fifth object of the invention to provide a scanner system which is capable of easily converting an image of a film to an adequate electronic image, on the basis of light-source information which is recorded on a magnetic recording medium on the film.

It is a sixth object of the invention to provide a scanner system which can optimize an integrating time of a photoelectric conversion element, the number of added pixels, brightness of a light source, feeding speed of a film, and the like, on the basis of information which is recorded on a magnetic recording medium on the film, so as to be capable of easily converting an image of the film to an adequate electronic image.

Briefly, according to the invention, there is provided a system for reading an image formed on a silver-salt film, comprising:

(a) magnetic information reading means for reading magnetic information recorded on a magnetic recording medium on the film;

(b) feeding means for feeding the film;

(c) illuminating means for irradiating light to the image formed on the film;

(d) filter means arranged between the illuminating means and the film;

(e) photoelectric conversion means for receiving the light from the illuminating means, which is passed through the film, to convert the image formed on the silver-salt film to an electric signal;

(f) memory means for storing an image signal from the photoelectric conversion means; and (g) control means for controlling at least one of the feeding means, the illuminating means and the photoelectric conversion means, on the basis of information of the information reading means.

These as well as other objects and advantages of the present invention will become further apparent from the following detailed explanation.

BRIEF DESCRIPTION OF THE DRAWINGS

FIG. 17 is an explanatory view showing the relationship between information and an angle of view regarding trimming, in the above-described first embodiment;

FIG. 18 is an explanatory view showing the relationship between zoom magnification or a scale factor and an angle of view in the aforesaid first embodiment;

DETAILED DESCRIPTION OF THE PREFERRED EMBODIMENTS

Various embodiments of the invention will hereunder be described with reference to the accompanying drawings.

Figure 1:
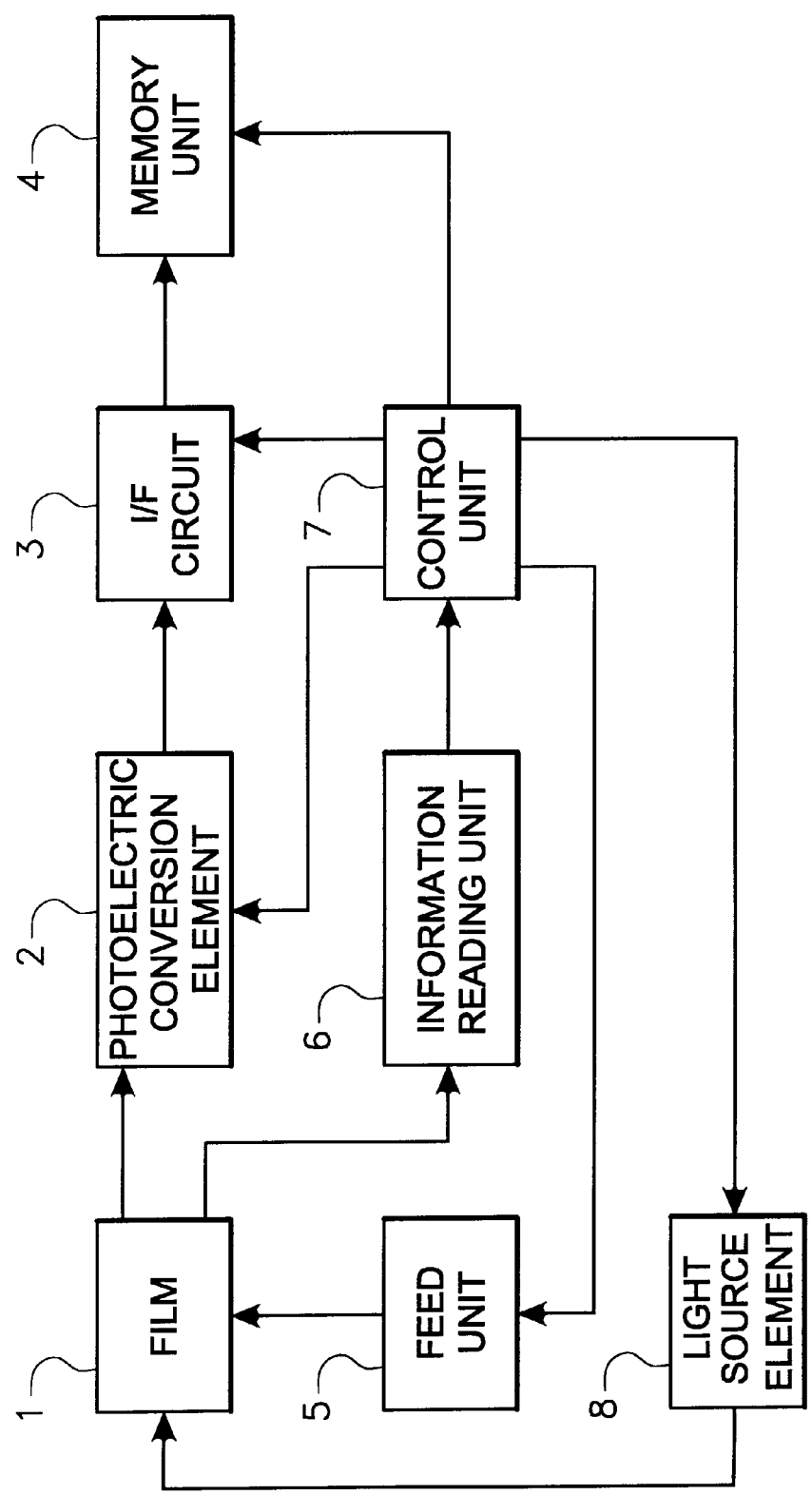
FIG. 1 is a block diagram showing an arrangement of a scanner system according to a first embodiment of the invention.

FIG. 1 is a block diagram diagrammatically showing an arrangement of a scanner system according to a first embodiment of the invention.

The first embodiment comprises, as a principal portion thereof, a film 1 recordable of information regarding luminance or intensity, trimming, a light source and the like upon photographing and information regarding the type or kind of the film, an information reading unit 6 which reads information recorded on the film 1, a photoelectric conversion element 2 for fetching an image signal from the film 1 as an electric signal in accordance with a signal of a control unit 7 to be described subsequently, an I/F circuit 3 for converting an output from the photoelectric conversion element 2 to an amplification•digital value in accordance with a signal of the control unit 7 to store the amplification•digital value to a memory unit 4 to be described subsequently, the memory unit 4 for storing a signal from the I/F circuit 3 in accordance with a signal of the control unit 7, a feeding unit 5 for feeding-drive the film 1 in accordance with a signal from the control unit 7, a light-source unit 8 for irradiating predetermined light to the film 1 in accordance with a signal from the control unit 7, and the control unit 7 for controlling the photoelectric conversion element 2, the I/F circuit 3, the feeding unit 5, the light-source unit 8 and the memory unit 4 on the basis of the information of the film 1 from the information reading unit 6.

In connection with the above, the control unit 7 causes an integrating time of the photoelectric conversion element 2, the number of reading addition pixels, and the like, together with the feeding speed of the film 1, the intensity or strength of the light source, and the like to be variable on the basis of the information of the film 1.

The arrangement of the first embodiment will be described in further detail, the arrangement of the first embodiment being that as shown in a block diagram in FIG. 2. That is, the first embodiment comprises, as a principal portion thereof, the film 1 on which information regarding the type or kind of the film, brightness upon photographing, trimming, date, time, a restriction value/a shutter speed upon photographing and the like is recordable, a pair of motor units 24 and 25 for retaining the film 1 to perform feeding, a motor control circuit 16 for controlling the motor units 24 and 25, a light source 20 for illuminating the film 1, a filter 21 for controlling a wavelength characteristic of the light source 20, a light source power circuit 19 for controlling a quantity of light of the light source 20, a filter control circuit 18 for performing exchange control of the filter 21 in order to switch the wavelength, a magnetic head 23 for reading the information which is recorded on the film 1, a magnetic circuit 12 for amplifying•shaping waveform information of the magnetic head 23 to transmit: the information to a CPU 11, a display LCD 27 for displaying the read condition or the like, a switch input circuit 26 (hereinafter referred to as "SW input circuit 26") having a switch for modifying an information reading condition or the like, a sensor 14 for reading the image signal of the film 1, a photo detector 15 for detecting feeding of the film by the utilization of perforations in the film, an I/F circuit 13 for controlling the integrating time, the pixel addition, reading, amplification or the like and the photo detector 15, a memory 28 for recording the read image signal, and the CPU 11 for controlling the power circuit 19, the filter control circuit 18 and filter 21, the motor control circuit 16, the I/F circuit 13, the display LCD 27, the memory 28 and the magnetic circuit 12.

Figure 3:
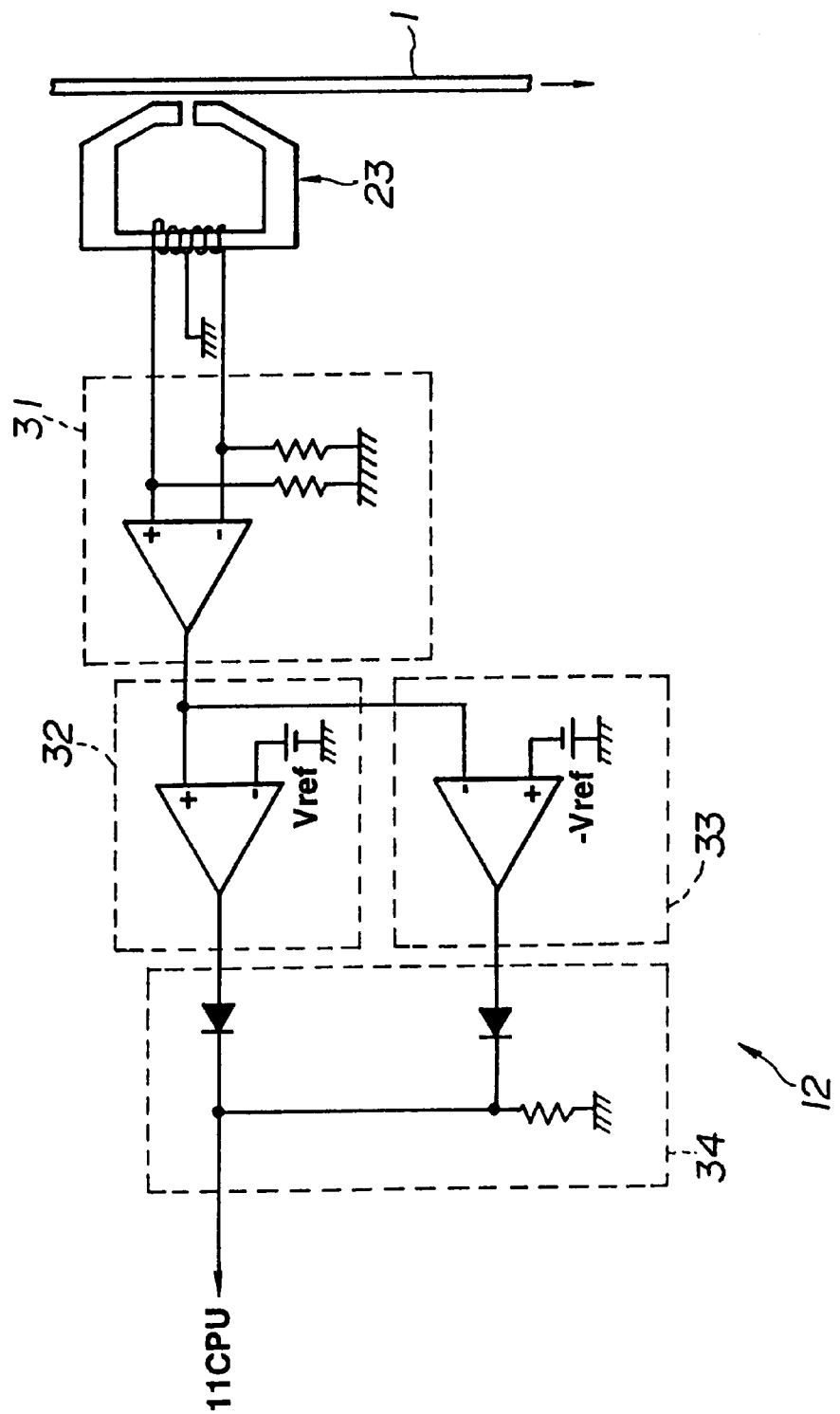
FIG. 3 is an electric circuit view showing a circuit arrangement of a magnetic circuit in the aforementioned first embodiment, in detail.

FIG. 3 is an electronic circuit diagram showing the circuit arrangement of the magnetic circuit 12 in the aforesaid first embodiment in detail.

The magnetic circuit 12 comprises magnetic head 23 for reading the information which is recorded on the film 1 by magnetic tracks thereof, a head amplifier 31 for amplifying a read magnetic signal, a pair of comparator circuits 32 and 33 for shaping, in waveform, a signal of the head amplifier 31, and an OR circuit 34 for detecting an OR of outputs from the comparator circuits 32 and 33. An output from the OR circuit 34 is transmitted to the CPU 11 (refer to FIG. 2).

Figure 4:
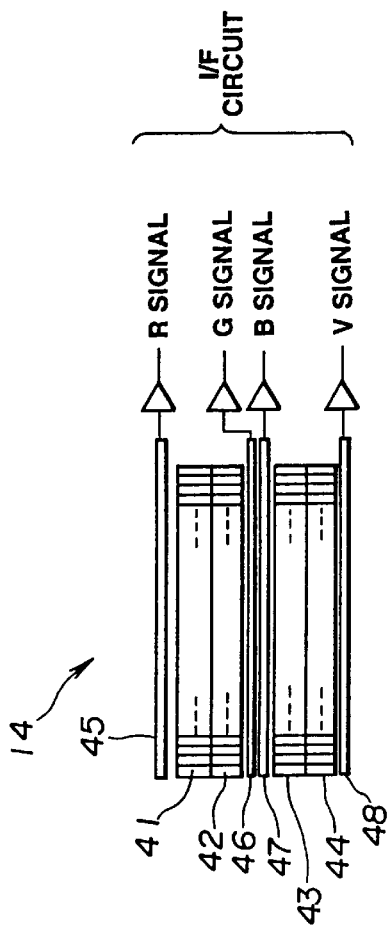
FIG. 4 is a block diagram showing, in detail, an arrangement of a sensor in the above-mentioned first embodiment.

FIG. 4 is a block diagram showing the arrangement of the sensor 14 in detail.

The sensor 14 comprises three (3) line sensor sections 41, 42 and 43 corresponding respectively to RGB signals separated from each other through respective filters thereof, a line sensor section 44 corresponding to an intensity signal (V signal), and latch sections 45, 46, 47 and 48 having respective memory functions thereof for each of the line sensor sections. Moreover, sensor outputs from the respective latch sections 45, 46, 47 and 48 are sent to the I/F circuit 13 (refer to FIG. 2).

Figure 5:
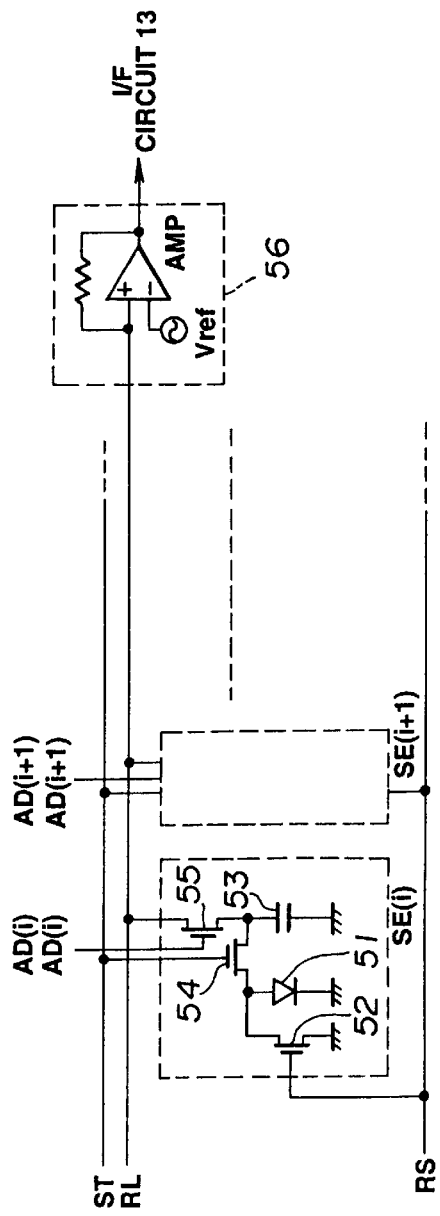
FIG. 5 is a circuit view showing an arrangement of a single pixel of the sensor in the aforesaid first embodiment.

FIG. 5 is a circuit view showing an arrangement of a single pixel of the sensor 14. In this connection, it is assumed in FIG. 5 that a pixel cell at the number i is SE(i).

Figure 2:
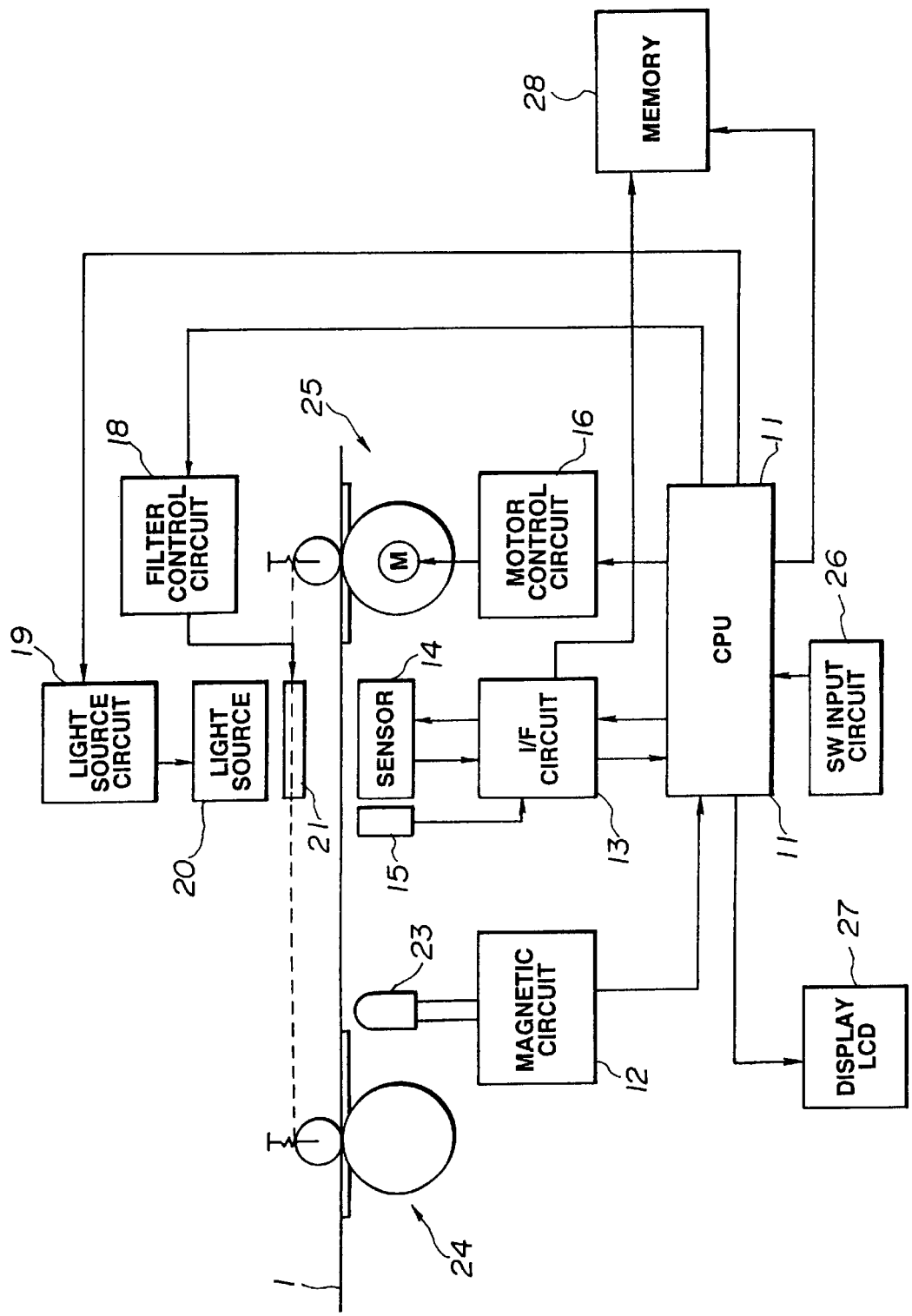
FIG. 2 is a block diagram showing the arrangement of the aforesaid first embodiment, in further detail.

As shown in FIG. 5, a single cell SE comprises a photo diode 51 for generating a (current) in accordance with the quantity of light detected, a transistor 52 for resetting the photo diode 51, a latch section 53 for temporarily storing a signal which is generated at the photo diode 51, a transistor 54 for reading the signal to the latch section 53 from the photo diode 51, and a transistor 55 for sending the signal stored in the latch section 53 to the I/F circuit 13 (refer to FIG. 2). A read signal is outputted to the I/F circuit 13 through an addition amplifying amplifier 56. Furthermore, a reset signal RS, a latch signal ST and a reading signal RL are transmitted to the sensor 14 from the CPU 11 (refer to FIG. 2) through the I/F circuit 13.

Figure 6:
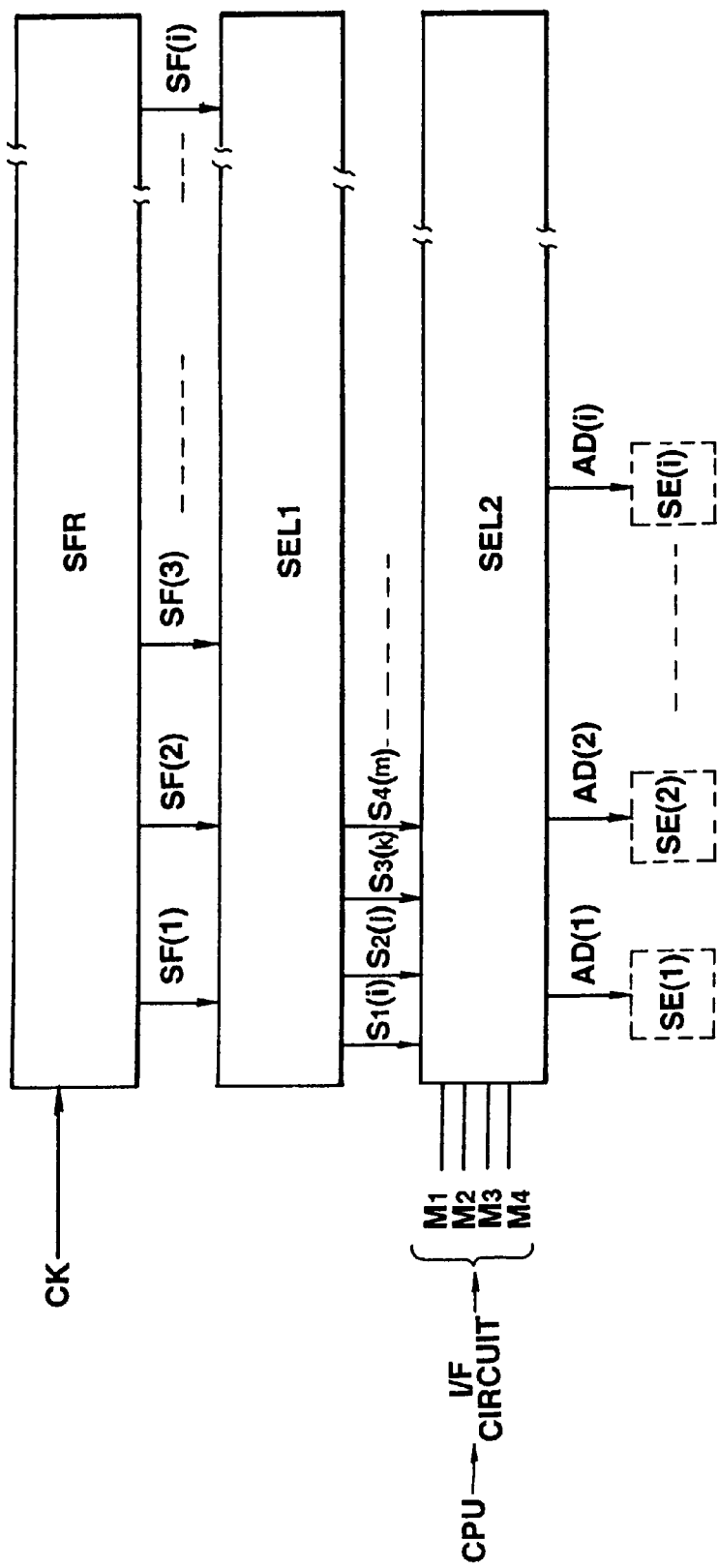
FIG. 6 is a block diagram showing an arrangement of a sensor control circuit of a single line, of the sensor in the aforementioned first embodiment.

FIG. 6 is a block diagram showing the arrangement of a sensor control circuit of a single line in the sensor 14.

The sensor control circuit comprises a shift register circuit SFR for creating a shift signal SF(i), a circuit SEL1 for creating signals S1(i), S2(j), S3(k) and S4(m) upon pixel addition on the basis of a shift signal SF(i) from the shift register circuit SFR, a circuit SEL2 for transmitting these signals S1(i), S2(j), S3(k) and S4(m) of the SEL1 to a pixel cell SE(i) as a signal AD(i) in accordance with a reading mode (a mode of pixel addition), and the pixel cell SE(i).

Figure 7:
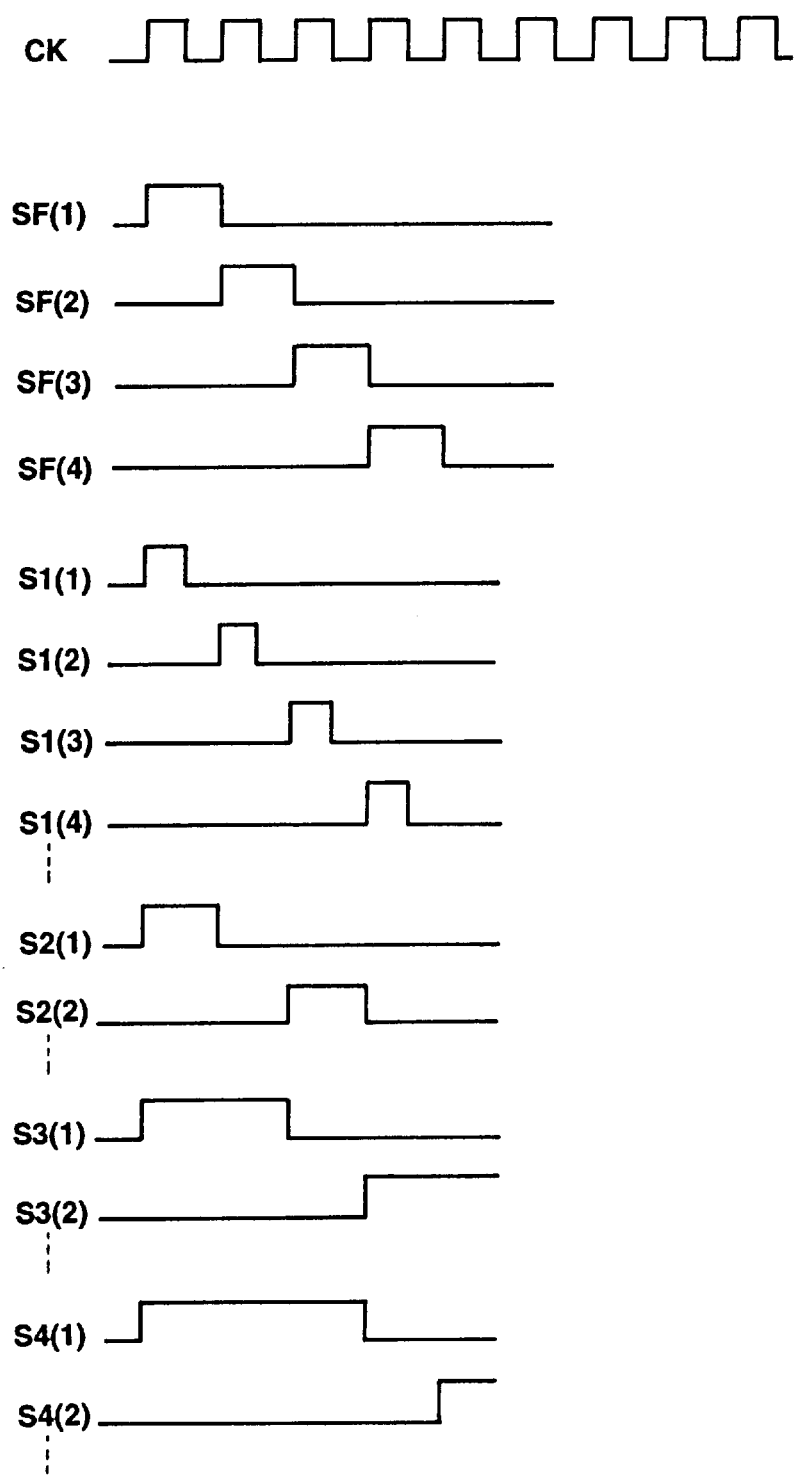
FIG. 7 is a time chart showing a signal condition in FIG. 6; I

FIG. 7 is a time chart showing a signal condition in FIG. 6.

Described on the time chart are a shift register SF(i) outputted from the shift register SFR circuit, and various signals including a signal S1(i) created by the signal SF(i) from the SFR, a clock CK: reading of a single pixel, a signal S2(j): reading of two pixel addition, a signal S3(k): reading of three (3) pixel addition, and a signal S4(m): reading of four (4) pixel addition.

FIGS. 8(a), 8(b), 8(c) and 8(d) describe a circuit arrangement of SEL1 in FIG. 6 in further detail.

Figure 8A:
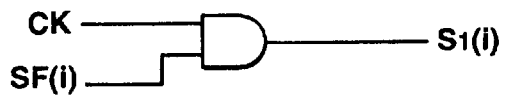
FIGS. 8(a)–8(d) are circuit views showing, in further detail, a circuit arrangement of a SEL1 in FIG. 6.
Figure 8B:
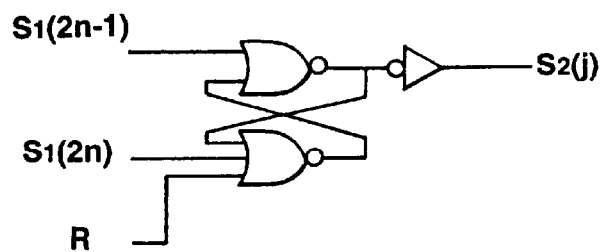
Figure 8C:
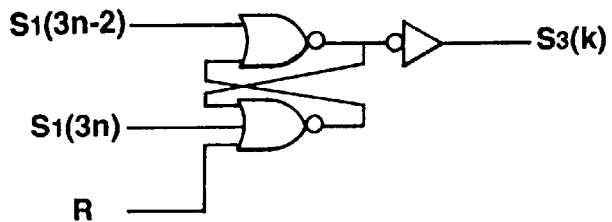
Figure 8D:
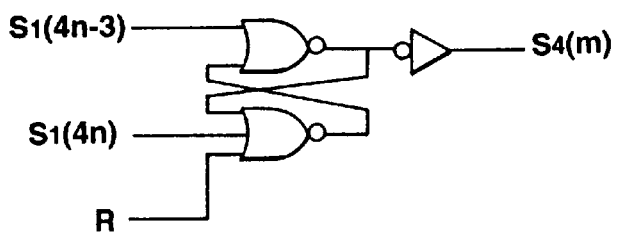

As shown in FIG. 8(a), a signal S1(i) is generated by taking a logical AND of the clock CK and the signal SF(i). Moreover, as shown in FIG. 8(b), FIG. 8(c) and FIG. 8(d), signals S2(j), S3(k) and S4(m) are generated by a flip-flop due to signal sequence of the signal S1(i). In this connection, j=CN [i/2]+1, k=CN [i/3]+1 and m=CN [i/4]+1, where the CN [h] is an integer value in which a value equal to or less than a decimal point of a value of h (h: real number) is discarded.

Figure 9:
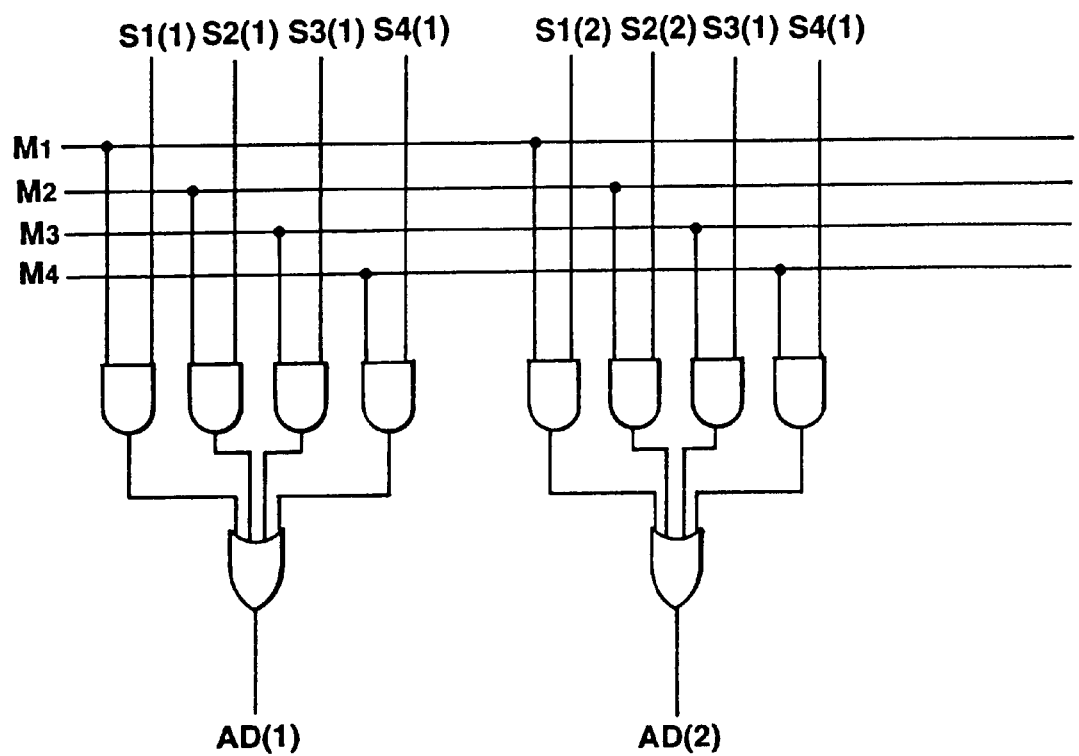
FIG. 9 is a circuit view showing, in further detail, a circuit arrangement of a SEL2 in FIG. 6.

FIG. 9 describes the circuit arrangement of the SEL2 in FIG. 6 in further detail.

The SEL2 is formed by a selecting circuit which selects signals of S1(i), S2(j), S3(k) and S4(m) which are outputted from the SEL1, in accordance with reading modes M1~M4 (M1: a single pixel reading mode, M2: a two pixel addition reading mode, M3: a three pixel addition reading mode, and M4: a four pixel addition reading mode).

Operation of the first embodiment will next be described with reference to a flow chart illustrated in FIG. 10.

After sequence start (Step S101), flags are initialized (flags MC, LT, LZ, LB, LL, LFL and LR=0: trimming information T=00, reverse correction information ΔB=011, light-source information L=00, film information F=00, and zoom scale-factor information Z=000) (Step S102), to set a frame which fetches an image of the film (Step S103), so that the film is fed to a predetermined position (Step S104). Subsequently, information recorded on the film is read while the film is fed to the predetermined position (Step S105). After feeding of a single frame has been completed (Step S105-1), frame feeding stops (Step S105-2). Subsequently, a subroutine "mode setting/display" is performed (Step S106), to perform a subroutine "mode change or modification detection" (Step S107).

Subsequently, judgment of the flag MC is performed (which becomes 1 in a case where there is a mode change or modification) (Step S108). In a case where MC is not equal to 1 (there is no mode modification), a program proceeds to Step Silo. Further, in a case where MC is equal to 1 (there is mode modification), modification of the mode is confirmed by a display (Step S109). Subsequently, a subroutine "information recording" which records information recorded on the film and information of the modified mode is recorded onto an area corresponding to a memory which records an image (Step S110). Subsequently, a filter of the light source is set in accordance with the information (Step S111). A subroutine "setting of integrating conditions" which sets conditions regarding the integration (Step S112), a subroutine "setting of driving conditions" which sets driving conditions of the film (Step S113), a subroutine "setting of reading conditions" for setting conditions regarding pixel reading (Step S114) and start of driving of reading of the image/reading of the pixel (Step S115) are performed.

Subsequently, completion of a single frame is Judged by a signal of the photo detector (Step S116). In a case where the single frame is not completed, driving of the film and reading of the pixel are performed, and the program is returned to Step S116. In a case where the single frame has been completed, driving of the film/reading of the pixel has been completed (Step S117), and the present sequence has been completed (Step S118).

Figure 10:
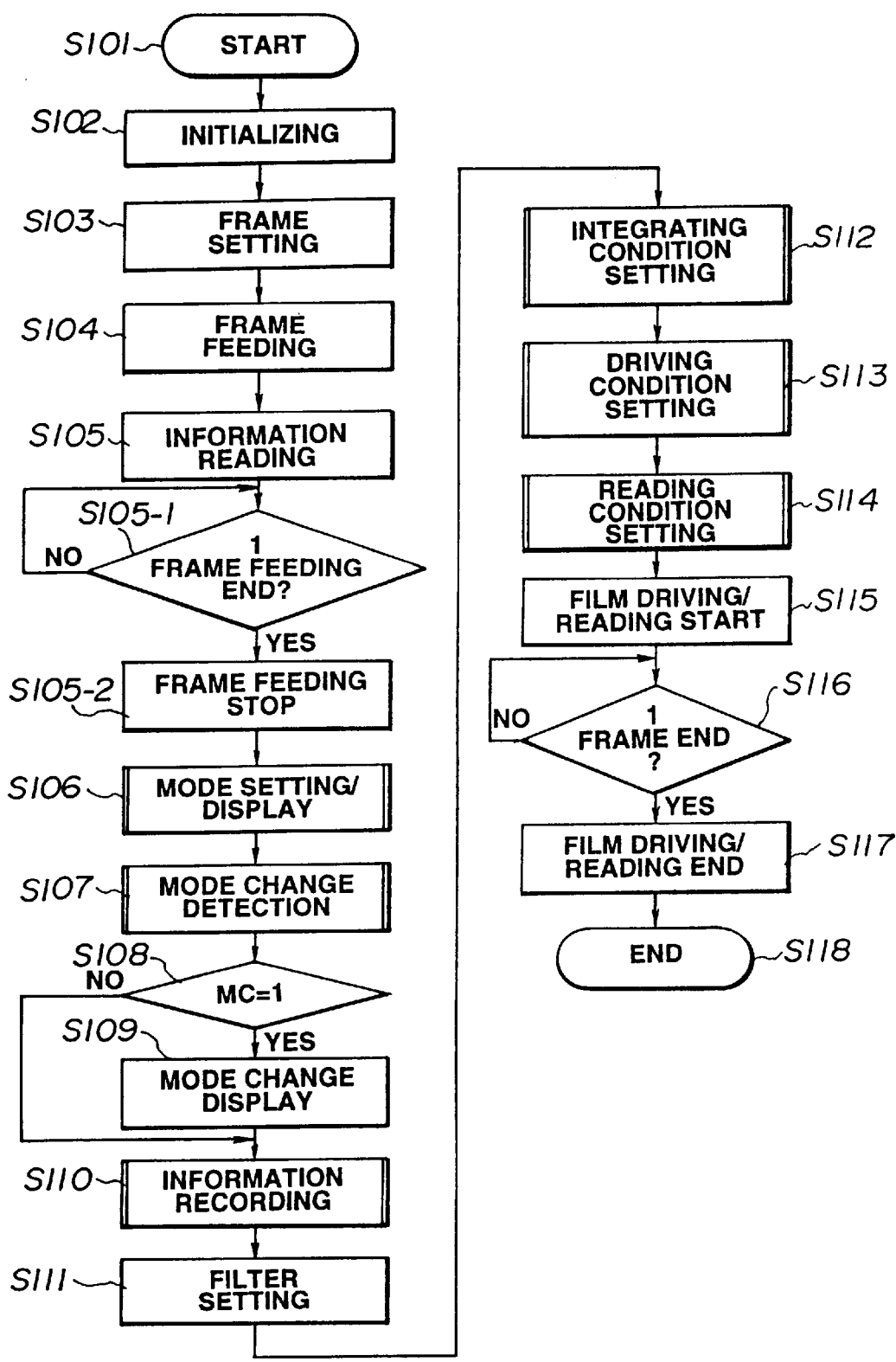
FIG. 10 is a flow chart showing the operation of the above-described first embodiment.
Figure 11:
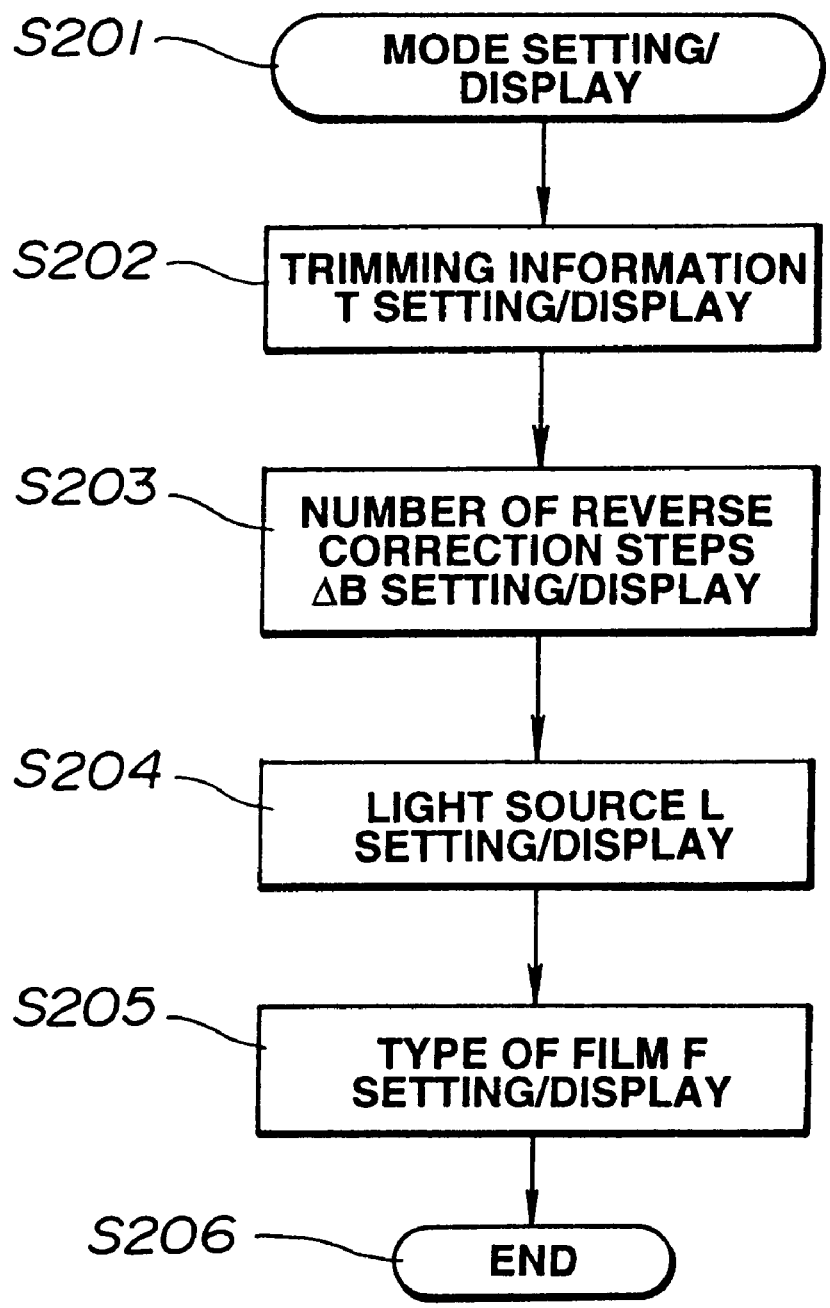
FIG. 11 is a flow chart showing sequence of a subroutine "mode setting/display" regarding setting from film information of a mode, in the aforementioned first embodiment.

FIG. 11 is a flow chart showing a sequence of a subroutine "mode setting/display" regarding setting from the film information of the mode of Step S106 (refer to FIG. 10).

After sequence start (Step S201), trimming information T setting/display is performed from the film information (Step S202). Setting/display of the number of reverse correction steps ΔB is performed (Step S203). Subsequently, setting/display of the light source L (Step S204) and setting/display of the type or kind of the film F (Step S205) are performed. The present sequence ends (Step S206).

Figure 12:
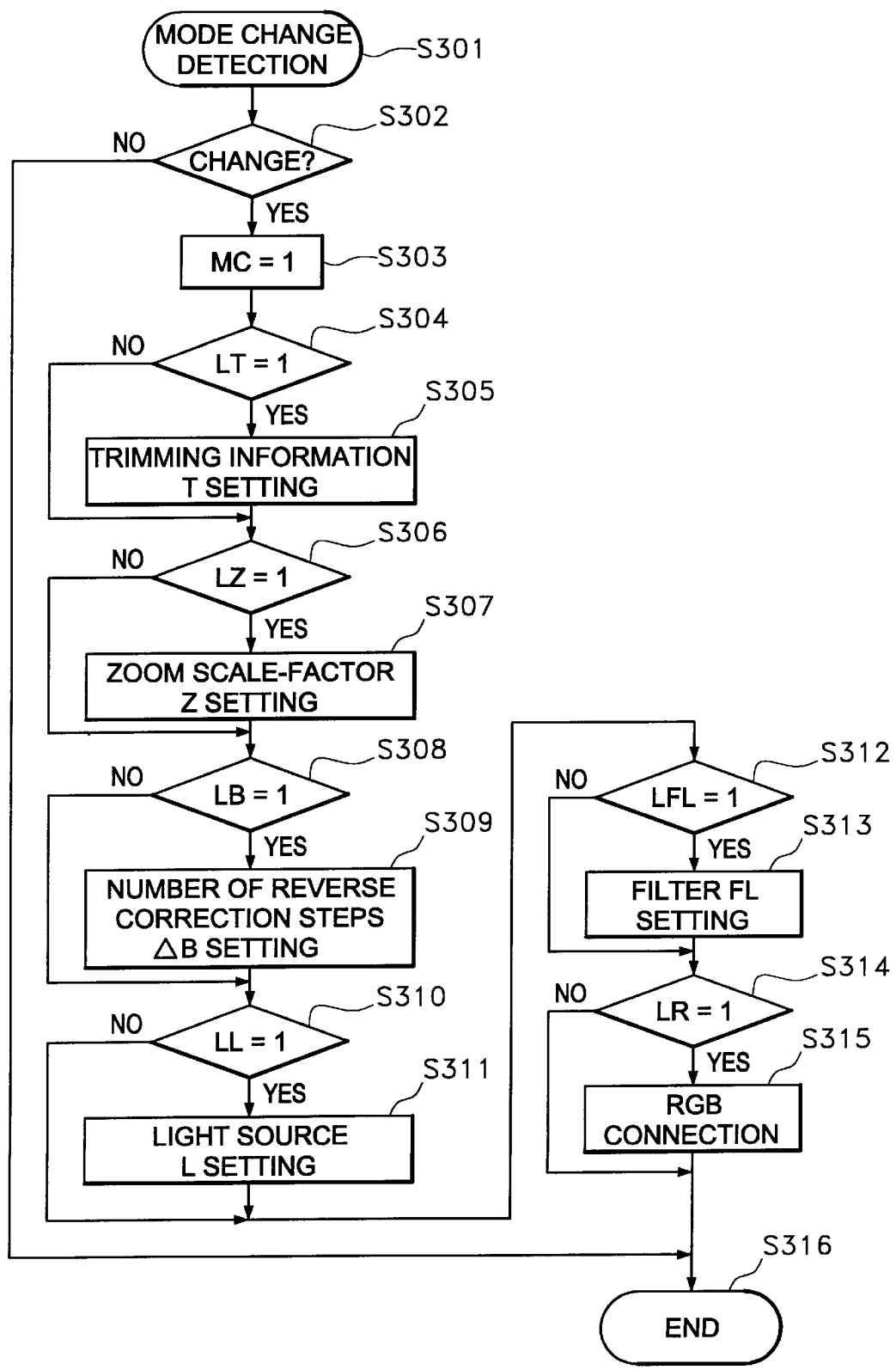
FIG. 12 is a flow chart showing sequence of a subroutine "mode change or modification detection" regarding modification due to a manual of a mode, in the aforesaid first embodiment.

FIG. 12 is a flow chart showing a sequence of a subroutine "detection of mode change or modification" regarding modification due to the manual of the mode of the aforesaid Step S107 (refer to FIG. 10).

After sequence start (Step S301), detection of modification presence/absence is performed (Step S302). In a case where modification is absent, a program proceeds to Step S316. In a case where modification is present, a flag MC is set to 1 (Step S303). Judgment of a flag LT regarding the trimming (in a case where there is modification regarding Hi) L trimming, setting is made to LT=1) is performed (Step S304). In a case where LT is not equal to 1, the program proceeds to Step S306.

In a case where LT is equal to 1 at Step S304, trimming information T is reset (Step S305). Judgment of a flag LZ (in a case where modification regarding a zoom scale factor is present setting is made to LZ=1) regarding the zoom scale factor is performed (Step S306). In a case where LZ is not equal to 1, the program proceeds to Step S308.

In a case where LZ is equal to 1 at Step S306, the zoom scale factor Z is reset (Step S307). Judgment of a flag LB (in a case where there is modification regarding correction of brightness, setting is made to LB=1) regarding correction of brightness is performed (Step S308). In a case where LB is not equal to 1, the program proceeds to Step S310.

In a case where LB is equal to 1 at Step S308, the number of reverse correction steps ΔB is reset (Step S309). Judgment of a flag LL (in a case where there is modification regarding the kind of the light source, setting is made to LL=1) regarding the light source is performed (Step S310). In a case where LL is not equal to 1, the program proceeds to Step S312.

In a case where LL is equal to 1 in Step S310, the kind L of the light source is reset (Step S311). Judgment of a flag LFL regarding the filter (in a case where there is modification regarding the filter, setting is made to LFL=1) is performed (Step S312). In a case where LFL is not equal to 1, the program proceeds to Step S314.

In a case where LFL is equal to 1 in Step S312, the filter FL is reset (Step S313). Judgment of the flag LR regarding RGB correction (in a case where there is modification regarding RGB, setting is made to LR=1) is performed (Step S314). In a case where LR is not equal to 1, the program proceeds to Step S316.

In a case where LR is equal to 1 in Step S314, correction of RGB is reset (Step S315), and the present sequence ends (Step S316).

Figure 13:
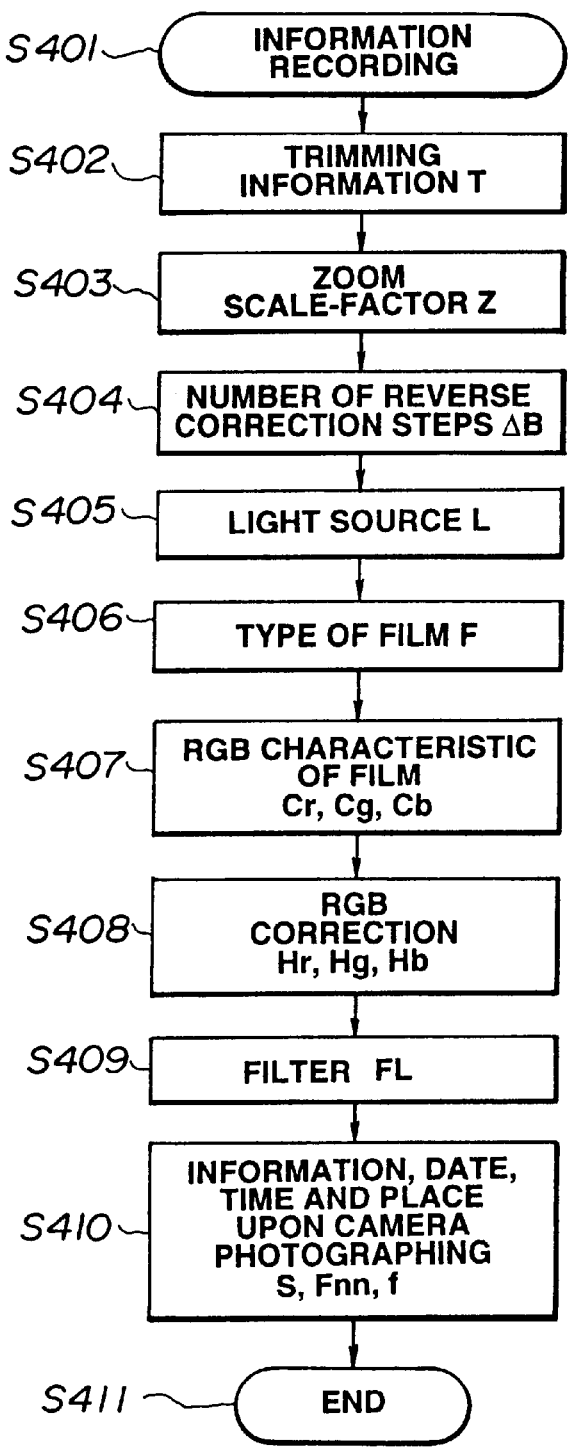
FIG. 13 is a flow chart showing a sequence of a subroutine "information recording" which records information modified by information/manual of a film correspondingly to the image of the film, in the above-mentioned first embodiment.

FIG. 13 is a flow chart showing a sequence of a subroutine "information recording" in which information modified by information/manual of the film in Step S110 (refer to FIG. 10) is recorded correspondingly to the image of the film.

After sequence start (Step S401), trimming information T, a zoom scale factor Z, the number of reverse correction steps LB, a light source L, the type or kind of a film F, RGB characteristic (Cr, Cg, Cb) of the film, RGB correction (Hr, Hg, Hb), a filter FL, and information upon photographing of a camera (date, time, location, shutter speed, restriction or stop value, focal length and the like) are stored in a memory correspondingly to image information (Step S402~Step S410), and the present sequence ends (Step S411).

Figure 14:
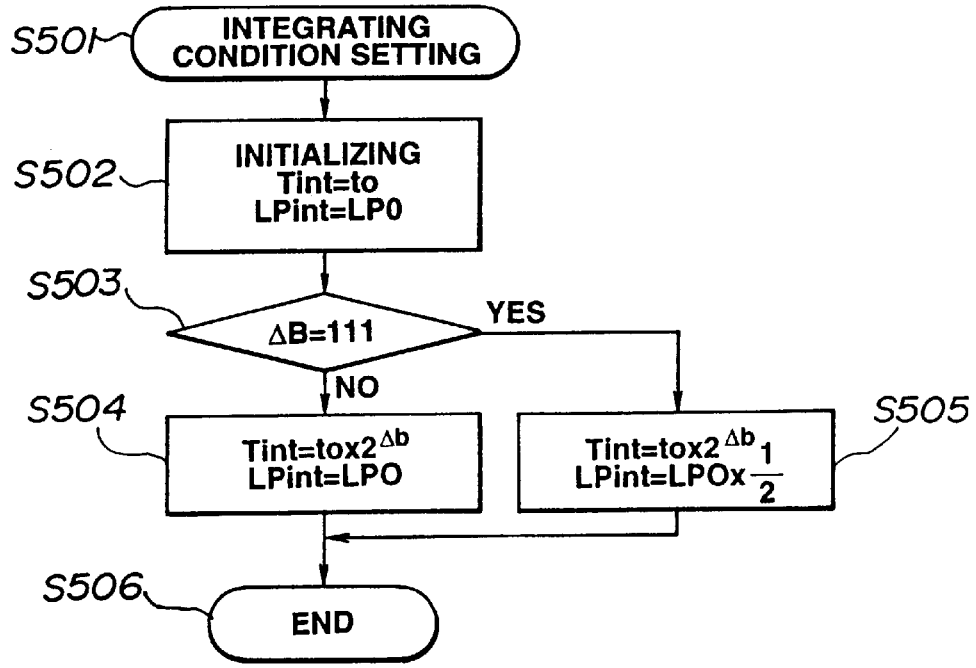
FIG. 14 is a flow chart showing a sequence of a subroutine "integrating condition setting" which sets a condition regarding integration of a sensor, in the above-described first embodiment.

FIG. 14 is a flow chart showing a sequence of a subroutine "setting of integrating conditions" which sets conditions regarding integration of a sensor in Step S112 (refer to FIG. 10).

After sequence start (Step S501), flags are initialized (integrating time Tint=t0; brightness of a light source LPint=LP0) (Step S502), to perform judgment of the number of reverse correction steps LB (ΔB: binary number of 3 bits) (Step S503).

In Step S503, in a case where ΔB is equal to 111, setting is made to Δb power of the integrating time, i.e. Tint=t0×2Δb and the brightness of the light source LPint=LP0/2 (Step S505), and the present sequence ends (Step S506).

Further, in a case where ΔB is not equal to 111 in Step S503, setting is made to Δb power of the integrating time, i.e. Tint=t0×2Δb and brightness of the light source LPint=LP0 (Step S504), and the present sequence ends (Step S506).

Figure 15:
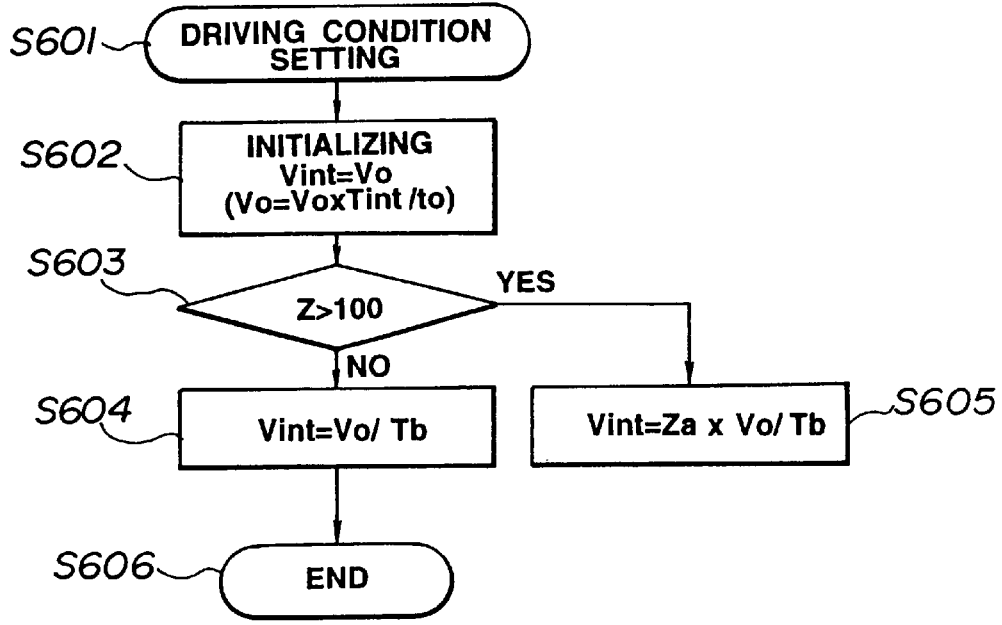
FIG. 15 is a flow chart showing a sequence of a subroutine "drive-condition setting" regarding feeding drive of a film, in the aforesaid first embodiment.

FIG. 15 is a flow chart showing a sequence of a subroutine "setting of driving conditions" regarding feeding drive of the film in Step S113 (refer to FIG. 10).

After sequence start (Step S601), the flags are initialized (feeding speed Vint=V0: where V0 depends upon the integrating time of the sensor, V0=V0×Tint/t0) (Step S602), to perform judgment of the zoom scale factor Z (Z: information of 3 bits) (Step S603).

In a case of Z>100 (binary number of 3 bits) in Step S603, setting is made to Vint=Za×V0/Tb (Step S605), and the present sequence ends (Step S606).

Moreover, in a case where it is not Z>100 (binary number of 3 bits) in Step S603, setting is made to Vint=V0/Tb (Step S604), and the present sequence ends (Step S606). In this connection, Za is a cardinal number or attribute of the zoom ring scale factor, and Tb is a coefficient of the trimming information in a lateral direction.

Figure 16:
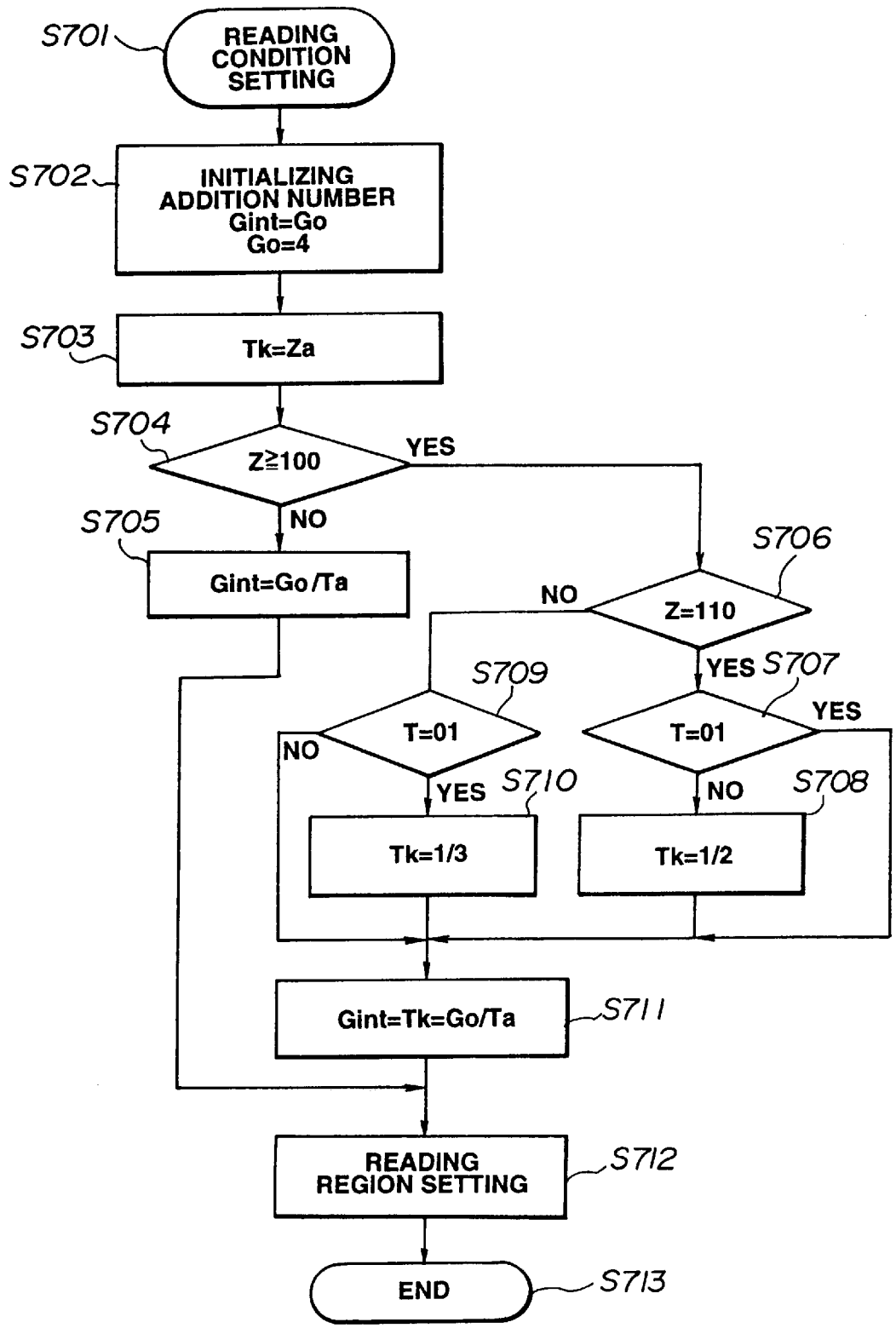
FIG. 16 is a flow chart showing a sequence of a L subroutine "reading condition setting" regarding reading of a signal from the sensor, in the aforementioned first embodiment.

FIG. 16 is a flow chart showing a sequence of a subroutine "setting of reading conditions" regarding reading of the signal from the sensor in Step S114 (refer to FIG. 10).

After sequence start (Step S701), the flags are initialized (pixel addition number Gint=G0: G0=4) (Step S702), to set a zoom scale factor Za to a parameter or variable Tk (Step S703). Subsequently, judgment of the zoom scale factor Z is performed (Step S704).

In a case where it is not Z≧100 (binary number of 3 bits) in Step S704, setting is made to Gint=Ga/Ta (Step S705). In a case where it is Z≧100 (binary number of 3 bits), judgment of Z=110 is further performed (Step S706). In a case where Z is equal to 110, judgment of trimming information T (T: binary number of 2 bits) is performed (Step S707). In a case where T is equal to 01, the program proceeds to Step S711. Furthermore, in a case where T is not equal to 01, setting is made to the variable Tk=½ (Step S708), and the program proceeds to Step S711.

In a case where Z is not equal to 110 in Step S706, judgment of the trimming information T is performed (Step S709). In a case where T is not equal to 01, the program proceeds to Step S711. Further, in a case where T is equal to 01, setting is made to the variable Tk=⅓ (Step S710), and the program proceeds to Step S711.

In Step S711, setting is made to a reading pixel addition number Gint=Tk×G0/Ta. Subsequently, setting of a reading area is made on the basis of the trimming information (Step S712), and the present sequence ends (Step S713). In this connection, Za is a coefficient of the zoom scale factor, while Ta is a coefficient of the trimming information in a longitudinal direction.

Next, the relationship between the information and the angle of view regarding the trimming is shown in FIG. 17.

FIG. 17 shows coefficients Ta and Tb in the longitudinal/lateral direction relating to the angle of view, the trimming information T (binary number of 2 bits) and trimming.

Moreover, a correcting coefficient regarding the brightness, information regarding a light source and information regarding a film age indicated in the Tables 1, 2 and 3 set forth below.

Table 1 indicates the relationship between the number of photographing correction steps at the film and the reverse correction information ΔB (binary number of 3 bits) and the correction coefficient Δb. Further, Table 2 indicates the relationship between the kind of the light source and the information L of the light source (binary number of 2 bits). Moreover, Table 3 indicates the relationship between the kind such as negative/positive, color/black and white, daylight/tungsten or the like and information F (binary number of 3 bits) regarding the film.

TABLE 1

| Correction | ΔB | Table Value Δb |
|---|---|---|
| −2 | 000 | 2 |
| −1 | 001 | 1 |
| −0.5 | 010 | 0.5 |
| 0 | 011 | 0 |
| 0.5 | 100 | −0.5 |
| 1 | 101 | −1 |
| 2 | 110 | −2 |
| 3 | 111 | −3 |

TABLE 2

| Light Source Type | L |
|---|---|
| Normal | 00 |
| Stroboscope | 01 |
| Fluorescent Lamp | 10 |

TABLE 3

| Film Type | F |
|---|---|
| Negative/Daylight | 000 |
| Negative/Tungsten | 001 |
| Positive/Daylight | 010 |
| Positive/Tungsten | 011 |
| Negative/B/W | 100 |
| Positive/B/W | 101 |

Further, the relationship between the zoom scale factor and the angle of view is shown in FIG. 18.

FIG. 18 shows the relationship between the zoom mode, information Z (binary number of 3 bits) regarding the zoom and the correction coefficients Za.

According to the present first embodiment, the integrating time, the addition pixel number, the brightness of the light source, the feeding speed of the film 1 and the like of the photoelectric conversion elements 2 are optimized on the basis of the information recorded on the film 1. Thus, it is made possible to easily convert the image of the film 1 to an adequate electronic image.

That is, the image fetching conditions of the scanner are set on the basis of the information recorded on the film, whereby it is possible to fetch an adequate electronic image similar to that upon a film photographing by simple operation.

Moreover, the first embodiment is arranged such that a fetching source of the information from the film is magnetic information. However, the invention should not be limited to this specific arrangement. For example, it is also possible that optical information such as bar codes or the like is recorded onto a film, and the optical information is a source for fetching the information. Furthermore, the side of the film need not be driven, but the side of the sensor may be driven to realize the present invention.

Further, the sensor 14 (refer to FIG. 4) forms a single line sensor section. In a case of a color, for example, it may fetch a signal by time sharing, that is, by a filter exchange system of three (3) of RGB, and one in a case of white and black. Moreover, the sensor 14 will be realized by the use of an electric-charge transmission type such as a CCD or the like, for example.

As described above, according to the present embodiment, there can be provided a scanner system which automatically performs setting of conditions optimum for electronic imaging of the film, by a simple arrangement.

A scanner system according to a second embodiment of the invention will next be described.

The second embodiment is substantially similar in arrangement to the first embodiment. Functions of the second embodiment are also similar to that of the first embodiment. Accordingly, only differences will be described here.

Figure 20:
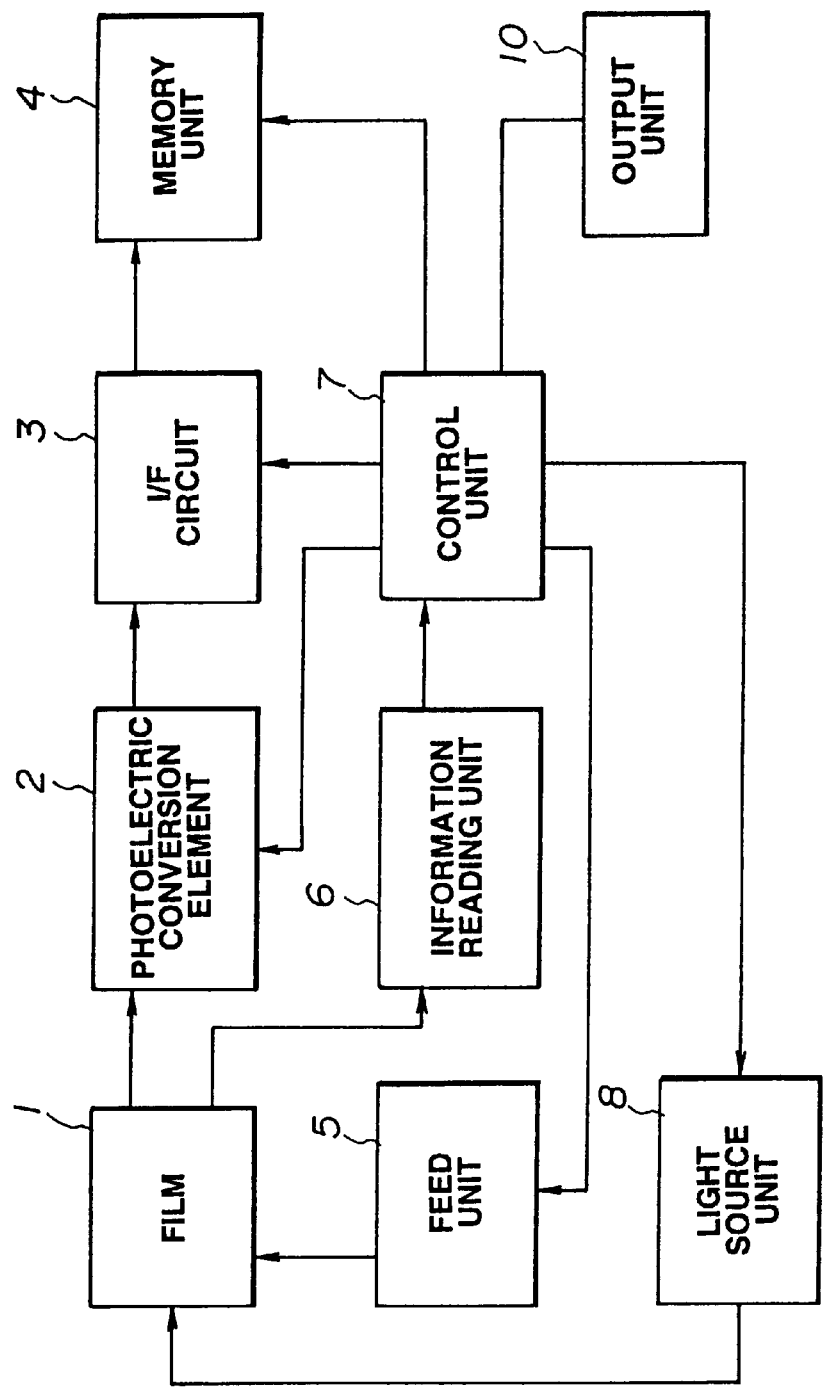
FIG. 20 is a block diagram showing an arrangement of the scanner system according to the second embodiment.

FIG. 20 is a block diagram showing an arrangement of the scanner system according to the second embodiment. As shown in FIG. 20, the second embodiment is arranged such that an output unit 10 for outputting an image signal is added with respect to the first embodiment. A control unit 7 has the function described in the first embodiment and, in addition thereto, is so arranged as to perform transmission control of the image signal with respect to the output unit 10.

Figure 21:
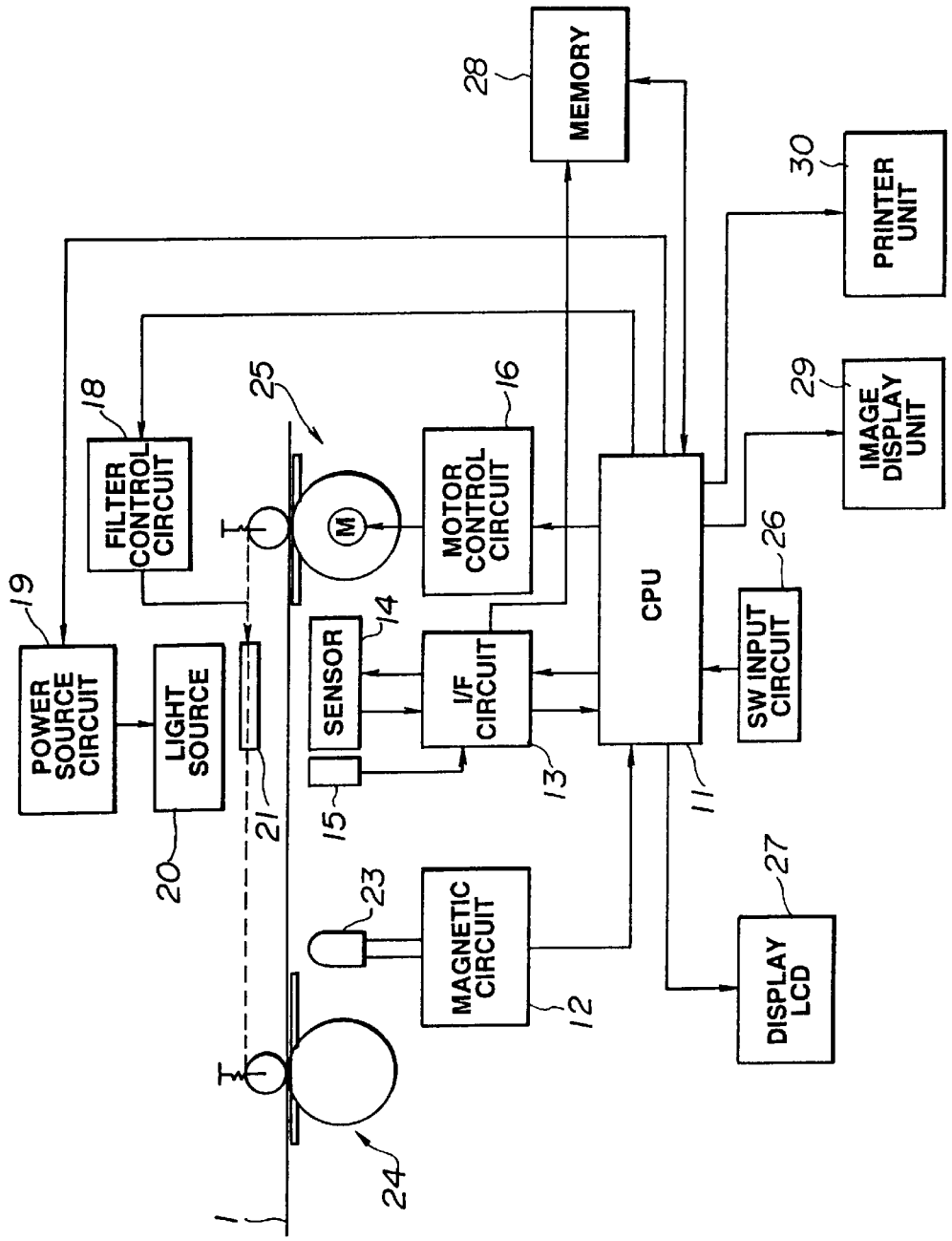
FIG. 21 is a block diagram showing the arrangement of the scanner system according to the second embodiment in further detail.

The output unit 10 will further be described specifically. As shown in FIG. 21, the output unit 10 comprises an image display unit 29 for displaying a read image signal and various kinds of information, and a printer unit 30 for outputting image information. The image display unit 29 and the printer unit 30 are controlled by a CPU 11.

An arrangement in the scanner system according to the invention on the side of a camera and a sequence thereof will next be described.

Figure 19:
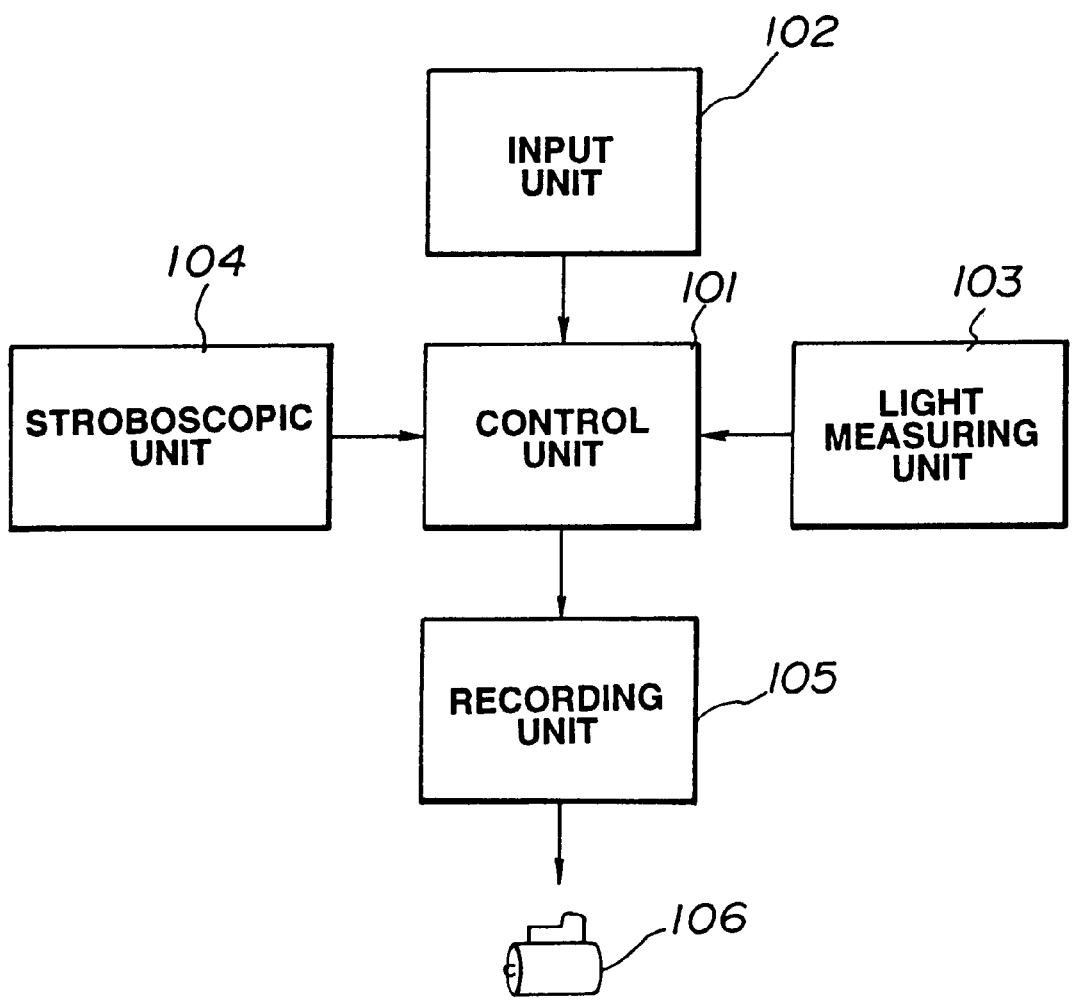
FIG. 19 is a conceptional view of a camera in a scanner system according to a second embodiment of the invention.

FIG. 19 is a schematic arrangement view of the camera.

As shown in FIG. 19, the camera comprises, as a principal portion thereof, a control unit 101 for performing control of the whole or entire camera, a light measuring unit 103 for detecting an intensity distribution/wavelength characteristic of a photographing scene (that is, a color temperature characteristic, a fluorescent lamp judgment and the like), a stroboscopic light-emission unit 104, an input unit 102 for setting information to the camera automatically or by manual inputting, and a recording unit 105 for recording the information upon photographing onto a film 106.

Figure 22:
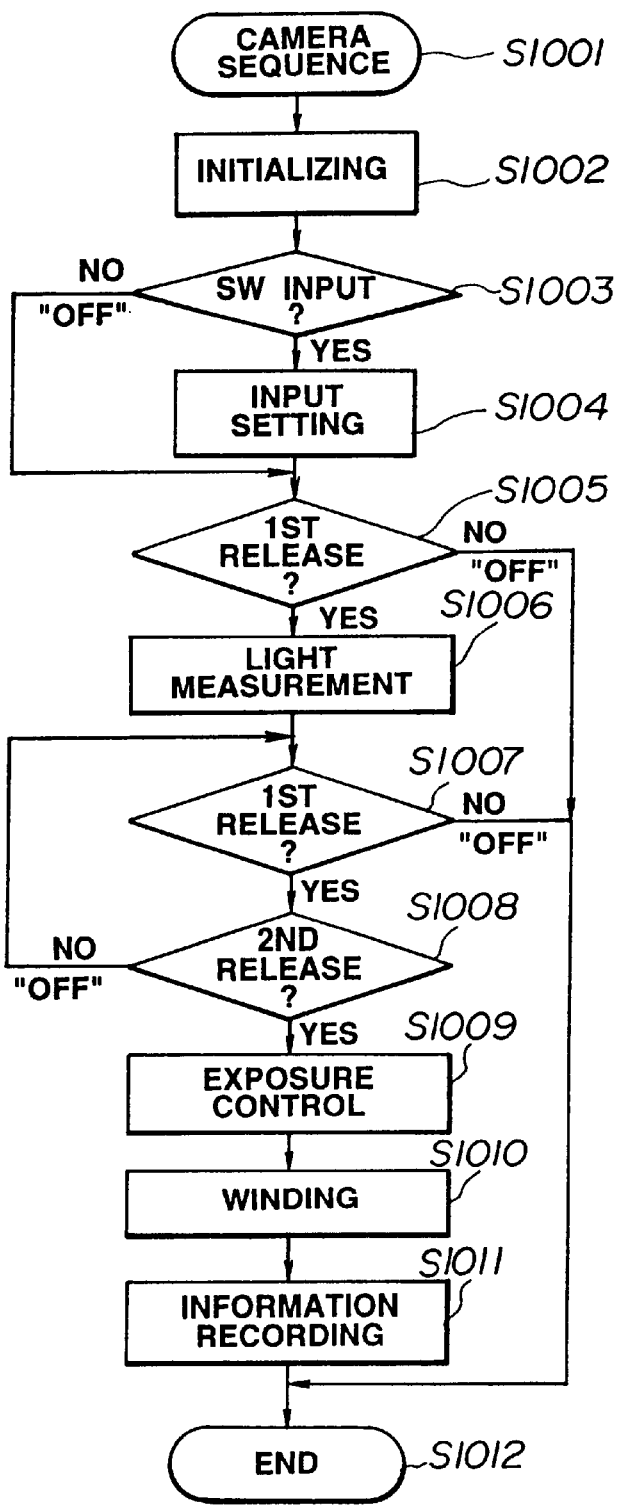
FIG. 22 is a flow chart showing operation of the camera in the scanner system according to the second embodiment.

FIG. 22 is a flow chart showing a sequence of the camera.

First, a camera sequence starts (Step S1001), and initializing (ISO setting and initializing of inputted information) is performed (Step S1002). Subsequently, judgment of presence and absence of switch inputting is performed (Step S1003). Here, in a case where there is no switch inputting, a program proceeds to Step S1005. In a case where there is switch inputting, setting conditions (a trimming mode, stroboscopic light emission, correcting information, date, time and the like) are modified in accordance with inputting conditions (Step S1004).

In Step S1005, judgment of a 1st release is performed. In Step S1005, in a case where the 1st release is "OFF", the present sequence ends (Step S1012). In a case where the 1st release is "ON", light measurement (intensity information and fluorescent-lamp judgment) is performed (Step S1006). Judgment of the 1st release is again, performed (Step S1007). In a case where the 1st release is "OFF", the present sequence ends (Step S1012). In a case where the 1st release is "ON", judgment of a 2nd release is performed (Step S1008).

In a case where the 2nd release is "OFF" in Step S1008, a program is returned to Step S1007. In a case where the 2nd release is "ON", exposure control (control on the basis of a mean light measuring value) is performed (Step S1009). Subsequently, winding of the film is performed, and information upon photographing is recorded (Step S1010 and Step S1011). Thus, the present sequence ends (Step S1012).

The information recorded upon winding of the film includes trimming information, light measuring correction information (the number of correcting steps with respect to a mean light measuring value), stroboscopic light emission information, light source information, set ISO information, type information of a film, date information, time information, location information and the like.

In this invention, it is apparent that working modes different in a wide range can be formed on this basis of this invention without departing from the spirit and scope of the invention. This invention is not restricted by any specific embodiment except as may be limited by the appended claims.

What is claimed is:

1. A system for reading an image formed on a silver-salt film, comprising:
    (a) a magnetic information reading unit for reading magnetic information recorded upon photographing on a magnetic recording medium on the film, said information for modifying the image on the film generated by the system;
    (b) feeding means for feeding said film;
    (c) illuminating means for irradiating light toward the image formed on said film;
    (d) a photoelectric image conversion unit comprising line sensor means for receiving light from said illuminating means, which is passed through said film, to convert a line of the image formed on said silver-salt film to an electric signal;
    (e) memory means for storing an image signal from said photoelectric conversion means;
    (f) a control unit for controlling at least one of said feeding means, said illuminating means and said photoelectric conversion means during line-by-line conversion of the image on the film, on the basis of information of said information reading means, said control of said feeding means including initially feeding a film frame to an image reading location and sequentially moving the frame relative to the line sensor means for sequentially converting an image of said frame, one line at a time into an electrical signal and
    (g) a modification unit for modifying information read by said information reading unit by manual operation, wherein said image conversion control unit controls said image conversion unit on the basis of the information read by said information reading unit and information modified by said modification unit.

2. A system for reading an image formed on a silver-salt film, according to claim 1, wherein said magnetic information is trimming information for trimming the image formed on said silver-salt film.

3. A system for reading an image formed on a silver-salt film, according to claim 2, wherein said control unit controls feeding conditions of said feeding means on the basis of said trimming information.

4. A system for reading an image formed on a silver-salt film, according to claim 3, wherein said feeding conditions are film feeding speed to alter image conversion by said photoelectric conversion means.

5. A system for reading an image formed on a silver-salt film, according to claim 2, wherein said control unit controls a number of pixels of said photoelectric conversion means that are read on the basis of said trimming information.

6. A system for reading an image formed on a silver-salt film, according to claim 1, wherein said magnetic information is relative light intensity information of the image formed on said silver-salt film.

7. A system for reading an image formed on a silver-salt film, according to claim 6, wherein said control unit controls an intensity of light irradiated by said illuminating means on the basis of said relative intensity information.

8. A system for reading an image formed on a silver-salt film, according to claim 6, wherein said control unit controls an integrating time of said photoelectric image conversion unit on the basis of said relative intensity information.

9. A system for reading an image formed on a silver-salt film, according to claim 1, wherein said magnetic information is light-source information which indicates under what light source the image formed on said silver-salt film was formed.

10. A system for reading an image formed on a silver-salt film, according to claim 9, wherein said control unit controls a filter means arranged between said illuminating means and said film on the basis of said light-source information to control a wavelength characteristic of light illuminating said film.

11. A system for reading an image formed on a silver-salt film, according to claim 9, wherein said control unit controls said illuminating means on the basis of said light-source information to control a wavelength characteristic of light illuminating said film.

12. A system for reading an image formed on a silver-salt film, according to claim 1, further including display means for displaying a memory value of said memory means.

13. A system for reading an Image formed on a silver-salt film, according to claim 12, wherein said display means includes monitor display means.

14. A system for reading an image formed on a silver-salt film, according to claim 12, wherein said display means comprises printing means.

15. A system for reading an image formed on a silver-salt film comprising:
    (a) a magnetic-information reading unit for reading information which is recorded onto said film upon photographing of said image, said information for modifying the image on the film generated by the system;
    (b) a photoelectric image conversion unit comprising a single line sensor for converting lines of the image formed on said film, to an electric signal;
    (c) memory means for storing an image signal from said photoelectric conversion means; and
    (d) a control unit for controlling said photoelectric image conversion unit for the basis of information of said information reading unit, said control unit providing relative movement between the film image and the single line sensor for converting the film image into electric signals, one line at a time and
    (e) a modification unit for modifying information read by said information reading unit by manual operation, wherein said control unit controls said image conversion unit on the basis of the information read by said information reading unit and information modified by said modification unit.

16. A system for reading an image formed on a silver-salt film having a magnetic recording medium, containing information written upon recording of said image on said film comprising:
    (a) a magnetic information reading unit for reading said information recorded onto said magnetic recording medium, said information for modifying the image on the film generated by the system;
    (b) an image reading unit comprising a single line sensor for electrically reading successive lines of the image formed on said film; and (c) a control unit for controlling said image reading unit on the basis of information of said magnetic information reading unit as the image on the film undergoes line-by-line conversion, said control unit providing relative movement between the film image and the single line sensor for converting the film image into electric signals, one line at a time; and (d) a modification unit for modifying information read by said magnetic information reading unit by manual operation, wherein said control unit controls said image reading unit on the basis of the information read by said magnetic information reading unit and information modified by said modification unit.

17. A system for reading an image formed on a silver-salt film having a magnetic recording medium, according to claim 16, wherein said information reading unit includes a magnetic head.

18. A system for reading an image formed on a silver-salt film having a magnetic recording medium, according to claim 16, wherein the information recorded onto said film is trimming information of said image.

19. A system for reading an image formed on a silver-salt film having a magnetic recording medium, according to claim 18, wherein said control unit controls said image reading means on the basis of said trimming information.

20. A system for reading an image formed on a silver-salt film having a magnetic recording medium, according to claim 19, wherein said image reading unit line sensor includes photoelectric conversion means having an a-ray of pixels, and wherein said control means controls a number of pixels of said photoelectric conversion means which are read on the basis of said trimming information.

21. A system for reading an image formed on a silver-salt film having a magnetic recording medium, according to claim 16, further including display means for displaying an image which is read by said image reading means.

22. A system for reading an image formed on a silver-salt film having a magnetic recording medium, according to claim 21, wherein said display means includes monitor display means.

23. A system for reading an image formed on a silver-salt film having a magnetic recording medium, according to claim 21, wherein said display means comprises printing means.

24. A system for reading an image formed on a silver-salt film having a magnetic recording medium, according to claim 16, wherein the information recorded on said film is relative light intensity information at a time said image is formed.

25. A system for reading an image formed on a silver-salt film having a magnetic recording medium, according to claim 24, wherein said image reading means includes photoelectric conversion means, and wherein said control means controls an integrating time of said photoelectric conversion means.

26. A system for reading an image formed on a silver-salt film having a magnetic recording medium, according to claim 24, wherein said image reading unit includes an illuminating unit for irradiating light toward said film, and wherein said control unit controls intensity of light irradiated by said illuminating unit on the basis of said intensity information.

27. A system for reading an image formed on a silver-salt film having a magnetic recording medium, according to claim 16, further including memory means for storing an image read by said image reading unit.

28. An apparatus for converting photographing information, recorded on a film during photographing of an image on said film to an electric signal, comprising:

(a) an image converting unit having light-source means and a photoelectric image conversion unit including a single line sensor for outputting a line of image information of the film as the electric signal;

(b) an information reading unit for outputting the photographing information recorded on the film as an electric signal as the image on the film undergoes line-by-line conversion;

(c) memory means for A/D converting an output signal from said photoelectric image conversion means and, subsequently, storing the output signal from said photoelectric image conversion means, and (d) a control unit operative in response to an output signal from said information reading unit to control at least one of said photoelectric image conversion unit and said memory means, and including means for providing relative movement between said film and said single line sensor to provide line by line conversion of the image into electric signals; and (e) a modification unit for modifying information read by said information reading unit by manual operation, wherein said control unit controls said image conversion unit on the basis of the information read by said information reading unit and information modified by said modification unit.

29. An apparatus for converting information recorded on a film to an electric signal, according to claim 28, further including a film feeding unit for feeding said film by a predetermined amount, wherein said film feeding unit is drivingly controlled by said control means in response to an output from said information reading unit.

30. An apparatus for converting information recorded on a film to an electric signal, according to claim 28, wherein intensity and color temperature of light emitted from said light-source means are controlled by said control unit in response to an output from said information reading unit.

31. An apparatus for converting information recorded on a film to an electric signal, according to claim 28, wherein said line sensor has an array of pixels and wherein one of an integrating time and a number of pixels of said photoelectric image conversion unit to be summed is controlled by said control unit in response to an output from said information reading means.

32. An apparatus for converting image information and magnetic information recorded onto a film having a magnetic recording section during photographing of an image on said film, to an electric signal, comprising:

(a) an image conversion unit having a photoelectric conversion unit and light-source means variable in intensity, for reading the image information on the film as an electric signal;

(b) magnetic-signal reproducing means for outputting information magnetically recorded on the film, as a reading electric signal, said information for modifying the image on the film;

(c) memory means for A/D converting an output signal from said photoelectric conversion unit and, subsequently, storing the output signal from said photoelectric conversion unit;

(d) a control unit for controlling at least one of said image conversion means and said memory unit as the image on the film undergoes line-by-line conversion in response to an output signal from said magnetic-signal reproducing means; and (e) a modification unit for modifying information read by said information reading unit by manual operation, wherein said control unit controls said image conversion unit on the basis of the information read by said information reading unit and information modified by said modification unit.

33. An apparatus for converting image information and magnetic information recorded onto a film having a magnetic recording section, to an electric signal, according to claim 32, including film feeding means for feeding said film a predetermined amount, wherein said film feeding unit is drivingly controlled by said control means in response to an output from said magnetic-signal reproducing means.

34. An apparatus for converting image information and magnetic information recorded onto a film having a magnetic recording section, to an electric signal, according to claim 32, wherein intensity and color temperature of light emitted from said light-source means are controlled by said control unit in response to an output from said magnetic-signal reproducing means.

35. An apparatus for converting image information and magnetic information recorded onto a film having a magnetic recording section, to an electric signal, according to claim 32, wherein said photoelectric conversion unit has an array of pixels and wherein an integrating time and a number of pixels of said photoelectric conversion unit to be summed are controlled by said control means in response to an output from said magnetic-signal reproducing means.

36. An apparatus comprising light-source means variable in intensity for illuminating a film with light of a predetermined color temperature and intensity, for converting an image and photographing information recorded on the film during photographing of said image, to an electric signal, said apparatus including:
   (a) signal reproducing means for outputting a photographing information signal recorded onto the film as an electric signal, said information for modifying the image on the film generated by the system;
   (b) a photoelectric conversion unit including a single line sensor for outputting a line of an optical image of the film irradiated by said light-source means, as an electric signal;
   (c) memory means for A/D converting an output signal from said photoelectric conversion unit and, subsequently, storing the output signal from said photoelectric conversion unit;
   (d) a control unit operative in response to an output signal from said signal reproducing unit for controlling at least one of said photoelectric conversion unit and said memory means as the image on the film undergoes line-by-line conversion, said control unit including means for controlling relative movement between said single line sensor and said film to provide line-by-line conversion of the film image; and
   (e) a modification unit for modifying information read by said information reading unit by manual operation, wherein said control unit controls said image conversion unit on the basis of the information read by said information reading unit and information modified by said modification unit.

37. An apparatus comprising light-source means variable in intensity for illuminating a film with light at predetermined color temperature and intensity, for converting an image and photographing information recorded on the film to an electric signal, according to claim 36, wherein said photoelectric conversion unit has storage-type line sensor means.

38. An apparatus comprising light-source means variable in intensity for illuminating a film with light at predetermined color temperature and intensity, for converting an image and photographing information recorded on the film to an electric signal, according to claim 36, wherein intensity and color temperature of light emitted from said light-source means are controlled by said control unit in response to an output from said signal reproducing means.

39. An apparatus having light-source means variable in intensity for illuminating a film with light at a predetermined color temperature and intensity, for converting an image and photographing information recorded on the film during photographing of said image, to an electric signal, said apparatus comprising:
   (a) photographing-information reproducing means for outputting photographing information recorded on said film, as an electric signal, said information for modifying the image on the film generated by the system;
   (b) a photoelectric conversion unit having storage-type single line sensor means for outputting an image of the film irradiated by said light-source means as an electric signal;
   (c) memory means for A/D converting an output signal from said photoelectric conversion unit and, subsequently, storing the output signal from said photoelectric conversion unit;
   (d) a control unit for controlling at least one of said photoelectric conversion unit and said memory means in response to an output signal from said photographing-information reproducing means as the image on the film undergoes line-by-line conversion, said control unit including means for providing relative movement between said single line sensor and said film to provide line-by-line conversion of the film image; and
   (e) a modification unit for modifying information read by said information reading unit by manual operation, wherein said control unit controls said photoelectric conversion unit on the basis of the information read by said information reading unit and information modified by said modification unit.

40. An apparatus having light-source means variable in intensity for illuminating a film with light at predetermined color temperature and intensity, for converting an image and photographing image recorded on the film to an electric signal, according to claim 39, wherein intensity and color temperature of light emitted from said light-source means are controlled by said control unit in response to an output from said photographing-information reproducing means.

41. A film scanner system for reading an image from a film comprising:
   (a) an image conversion unit comprising a single line sensor for converting a line of a photographing image recorded on said film during photographing of said image, to an electrical signal;
   (b) an information reading unit for reading information recorded on said film, said information for modifying the image on the film generated by the system;
   (c) an image conversion control unit for controlling said image conversion unit on the basis of the information read by said information reading unit as the image on the film undergoes line-by-line conversion, said control means including means for providing relative movement between said single line sensor and said film to provide line by line conversion of the film image; and
   (d) a modification unit for modifying information read by said information reading unit by manual operation, wherein said control unit controls said image conversion unit on the basis of the information read by said information reading unit and information modified by said modification unit.

42. A scanner system for reading an image from a film, according to claim 41, wherein said image conversion control unit varies an integrating time in said image conversion unit on the basis of the information of said information reading unit.

43. A scanner system for reading an image from a film, according to claim 41, wherein said image conversion control unit varies feeding speed of said film in said image conversion unit on the basis of the information of said information reading unit.

44. A scanner system for reading an image from a film, according to claim 41, wherein said image conversion control unit varies an image reading range of said film in said image conversion unit on the basis of the information of said information reading unit.

45. A scanner system for reading an image from a film, according to claim 41, wherein said image conversion control unit adds an output of said image conversion unit on the basis of the information of said information reading unit.

46. A scanner system for reading an image from a film, according to claim 41, wherein said image conversion control unit varies strength of a film illuminating light source in said image conversion unit on the basis of the information of said information reading unit.

47. A scanner system for reading an image from a film, according to claim 41, wherein said image conversion control unit varies a filter of a film illuminating light source in said image conversion unit on the basis of the information of said information reading unit.

48. A scanner system for reading an image from a film, according to claim 41, wherein said image conversion unit comprises a plurality of linear photoelectric conversion elements which are different in wavelength characteristic from each other.

49. A scanner system for reading an image from a film, according to claim 48, wherein said image conversion unit includes means which converts outputs from respective photoelectric conversion elements to digital values.

50. A scanner system for reading an image from a film, according to claim 41, wherein said image conversion control unit modifies an integrating time of said image conversion unit by said modifying unit.

51. A scanner system for reading an image from a film, according to claim 41, wherein said image conversion control unit modifies feeding speed of said film in said image conversion unit by said modifying unit.

52. A scanner system for reading an image from a film, according to claim 41, wherein said image conversion control unit modifies an image reading region of said film in said image conversion unit by said modifying unit.

53. A scanner system for reading an image from a film, according to claim 41, wherein said image conversion control unit adds an output of said image conversion unit on the basis of information said image conversion unit.

54. A scanner system for reading an image from a film, according to claim 41, wherein said image conversion control unit modifies strength of a film illuminating light source in said image conversion unit by said modifying unit.

55. A scanner system for reading an image from a film, according to claim 41, wherein said image conversion control unit modifies a filter of a film illuminating light source for varying said image conversion unit by said modifying unit.

56. A scanner system for reading an image from a film, according to claim 41, further including a memory unit for storing therein read information.

57. A scanner system for reading an image from a film, according to claim 56, wherein said memory unit stores information of said photographing image and information recorded onto the film.

58. A scanner system for reading an image from a film, according to claim 56, wherein said memory unit stores therein information of said photographing image and control information of said image conversion unit.

59. A scanner system for reading an image from a film, according to claim 56, wherein said memory unit stores information of said photographing image, information recorded on said film and control information of said image conversion unit.

* * * * *

UNITED STATES PATENT AND TRADEMARK OFFICE
CERTIFICATE OF CORRECTION

PATENT NO.   : 6,188,463 B1                                        Page 1 of 1
DATED        : February 13, 2001
INVENTOR(S)  : Kodama It is certified that error appears in the above-identified patent and that said Letters Patent is hereby corrected as shown below:

Column 5,
Line 11, after the word "a", delete "(current)" and insert therefor -- signal --.

Column 6,
Line 15, after the word "Step", delete "Silo" and insert therefor -- S110 --.
Line 59, before the word "trimming", delete "Hi) L".

Column 13,
Line 27, after the word "an", delete "a-ray" and insert therefor -- array --.

Signed and Sealed this

Nineteenth Day of February, 2002

Attest:

JAMES E. ROGAN
*Attesting Officer*    *Director of the United States Patent and Trademark Office*

UNITED STATES PATENT AND TRADEMARK OFFICE
CERTIFICATE OF CORRECTION

PATENT NO. : 6,188,463 B1
DATED : February 13, 2001
INVENTOR(S) : Shinichi Kodama It is certified that error appears in the above-identified patent and that said Letters Patent is hereby corrected as shown below:

Title page,
Item [73], after the word "Assignee:", delete "Olypus" and insert therefor
-- Olympus --.

Signed and Sealed this

Twenty-third Day of July, 2002

Attest:

JAMES E. ROGAN
Attesting Officer       Director of the United States Patent and Trademark Office